(12) United States Patent
Pope

(10) Patent No.: US 6,798,752 B1
(45) Date of Patent: Sep. 28, 2004

(54) METHOD AND SYSTEM FOR DETERMINING A NETWORK TOPOLOGY

(75) Inventor: Randall Paul Pope, Binghamton, NY (US)

(73) Assignee: Telesector Resources Group, Inc., New York, NY (US)

(*) Notice: Subject to any disclaimer, the term of this patent is extended or adjusted under 35 U.S.C. 154(b) by 663 days.

(21) Appl. No.: 09/618,701

(22) Filed: Jul. 18, 2000

(51) Int. Cl.[7] .............................................. H04L 12/28
(52) U.S. Cl. ...................... 370/254; 370/258; 370/404; 370/405
(58) Field of Search ................................. 370/254, 258, 370/386, 404, 405, 406, 420, 424, 468, 255, 256, 395.51, 400, 408; 709/220, 224, 251

(56) References Cited

U.S. PATENT DOCUMENTS 6,405,248 B1 * 6/2002 Wood ......................... 709/223

2002/0181503 A1 * 12/2002 Montgomery, Jr. ......... 370/468
2003/0009599 A1 * 1/2003 Lee et al. .................... 709/251
2003/0051032 A1 * 3/2003 Schenkel et al. ........... 709/224

OTHER PUBLICATIONS

"Optimal Topologies for Survivable Fiber Optic Networks Using Sonet Self–Healing Rings" by Ondria J. Watson, Globecom, pp. 2032–2038, 1991.

* cited by examiner

Primary Examiner—Phirin Sam
(74) Attorney, Agent, or Firm—Leonard C. Suchyta, Esq.; Joel Wall

(57) ABSTRACT

There is provided a method for determining a topology for a network. The method comprises the steps of obtaining data that describes a requirement for a service between a first node and a second node, and searching a state space to define a solution that fulfills the requirement. The solution provides a topographic arrangement for the first node and the second node in the network. There is also provided a system for determining a topology of a network.

24 Claims, 16 Drawing Sheets

Init State
Untried Demands: d1 d2 d3 d4 d5 d6 d7
Skipped Demands:

Rings: ( )
F* = 0   0   0   0

Open = {Init State}
Closed = { }

Best State = Init State

Fig. 4

Init State
Untried Demands: d1 d2 d3 d4 d6 d7
Skipped Demands: d5

Rings: ( )
F* = 0   0   0   0

Open = {Init State, State 1}
Closed = { }

Best State = State 1

State 1
Untried Demands: d1 d2 d3 d4 d6 d7
Skipped Demands:

Rings: ( (d5) )
F* = 1   0   2.75   0

Fig. 5

METHOD AND SYSTEM FOR DETERMINING A NETWORK TOPOLOGY

BACKGROUND OF THE INVENTION

1. Field of the Invention

The present invention relates to network planning, and in particular, to determining a network topology for placing rings in a telecommunications network.

2. Description of the Prior Art

Network planning involves determining where, when and how much new capacity, i.e., carrier facilities, must be added to the network in order to meet a demand for services through the network. The demand is described in a point to point demand forecast of traffic requirements between every pair of points in the network.

Many existing asynchronous telecommunications networks were planned using expert system techniques. The use of expert system techniques was feasible because the asynchronous networks were well understood by network engineers, and it was thus possible to develop a set of rules that could be applied by the expert system.

The telecommunications industry is, however, changing with an introduction of a synchronous technology know as a Synchronous Optical Network (SONET). SONET will likely replace nearly all telecommunications facilities. SONET, like its asynchronous counterpart, is a facility that carries telecommunications traffic in a network. Unlike asynchronous facilities that only connect two points in a direct link, SONET allows several points to be connected. Furthermore, these several points may be connected in two different types of architectures, i.e., a ring and a chain. The ring architecture is desirable because it is "self-healing" in a case of a cable cut.

The ring and chain architectures are a radical departure from the traditional point to point connections of the asynchronous facilities. The introduction of the ring and chain architectures significantly increases the number of alternative routing configurations available to network planners for meeting forecasted demands. Rather than merely connecting points in the network in a pair-wise manner with direct connections, network engineers must now determine sets of points that are to be connected, and the topology that should be used.

Ring placement is a particularly challenging task as a ring could be either unidirectional or bi-directional, each of which is suited for a particular type of traffic pattern. Furthermore, in the case of a SONET ring, the points on the ring must be connected in a circular, non-overlapping fiber optic path.

Ring architectures are also being incorporated into a telecommunications technology called Dense Wave Division Multiplexing (DWDM)/Optical rings. In Dense Wave Division Multiplexing, multiple colors of light are passed through a single fiber optic strand, thus permitting multiple signals through that strand. This increases the capacity of each fiber optic strand. In addition, Optical add/drop multiplexers (ADMs) are being developed in conjunction with DWDM technology to provide self-healing ring architectures based on light wave signals.

SUMMARY OF THE INVENTION

It is an object of the present invention to provide an improved method for determining a network topology.

It is another object of the present invention to provide such a method in which the topology is determined by performing a state space search of potential solutions defining various network topologies.

It is a further object of the present invention to provide such a method that places rings into the network.

It is yet a further object of the present invention to provide such a method that places rings in a SONET ring network or a Dense Wave Division Multiplexing (DWDM)/Optical ring network.

These and other objects of the present invention are achieved by a method for determining a topology of a network comprising the steps of obtaining data that describes a requirement for a service between a first node and a second node, and searching a state space to define a solution that fulfills the requirement, wherein the solution provides a topographic arrangement for the first node and the second node in the network. There is also provided a system for determining a topology of a network.

BRIEF DESCRIPTION OF THE DRAWINGS

FIGS. 4 through 11 are diagrams of an evolving state space search tree;

DESCRIPTION OF THE INVENTION

Figure 1:
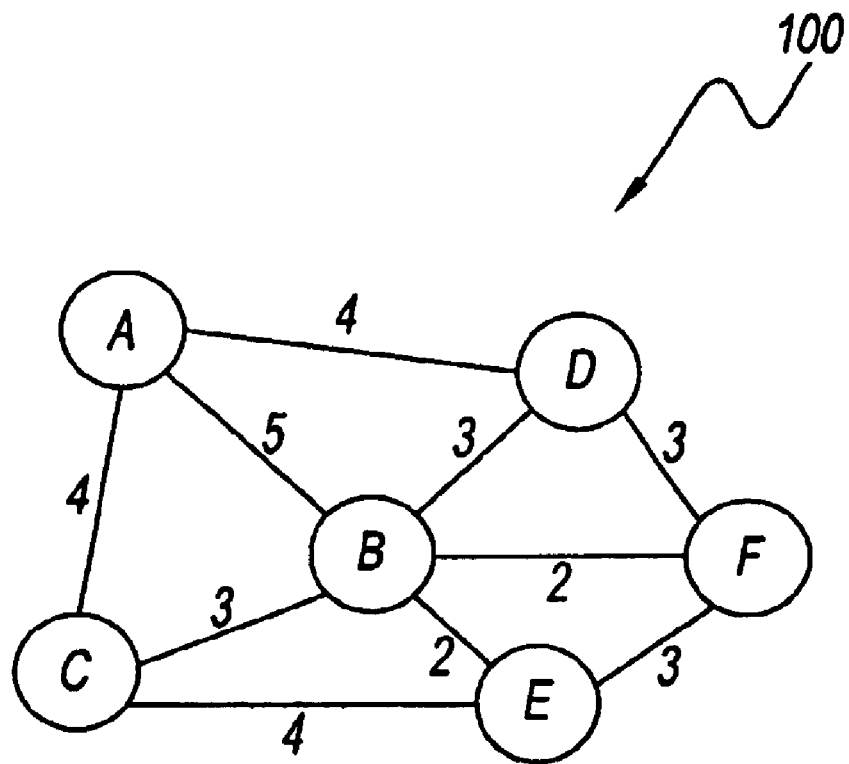
FIG. 1 is schematic of a network for which a network topology can be determined in accordance with the principles of the present invention.

FIG. 1 is schematic of a network 100 for which a network topology can be determined in accordance with the principles of the present invention. Network 100 includes nodes A, B, C, D, E and F. The nodes are interconnected via lengths of a communication cable, such as a fiber optic cable. The interconnections, and the length of the cable between nodes, are as indicated in Table 1. For example, there is a point-to-point connection between nodes A and B with a 5-mile length of cable.

TABLE 1

| LENGTH OF CABLE (MILES) BETWEEN NODES | | | | | |
|---|---|---|---|---|---|
| | A | B | C | D | E | F |
| A | | 5 | 4 | 4 | | |
| B | 5 | | 3 | 3 | 2 | 2 |
| C | 4 | 3 | | | 4 | |
| D | 4 | 3 | | | | 3 |
| E | | 2 | | 4 | | |
| F | | 2 | | 3 | | |

In a telecommunications network that can include rings, a forecasted demand for service through the network, i.e., data and/or voice traffic, is the driving force behind where to place the rings. A demand has a pair of endpoints, e.g., nodes A and B in FIG. 1, and a quantity of demand that is to be carried between the endpoints. Demand can enter and exit a ring at nodes in the ring where multiplexing equipment exists.

To implement a SONET ring, a SONET Add/Drop multiplexer (ADM) is located at each end of a fiber path between the ADMs. The amount of traffic that a signal can handle depends on the type of ADM.

Each fiber optic cable has several fiber optic strands. SONET rings require either 2 or 4 strands of fiber. Since a fiber optic cable has several strands, multiple SONET rings can ride the same fiber optic cable. For example in FIG. 1, depending upon fiber capacity, multiple rings can be implemented among BEF using the fiber cycle B-E-F-B.

The nodes through which the fiber path passes do not need to exactly match the nodes where the ADMs are located. The fiber path needs only has to cover the ADM locations at a minimum. For example, if the ring placement algorithm determines that a SONET ring will connect B, E, and F, i.e., an ADM will be located at each of B, E, and F, then the fiber cycle B-E-F-B could be used, but alternatively fiber cycles such as B-E-F-D-B or B-E-F-D-A-B, or any other cycle that included the ADM locations at a minimum, could be used instead. Typically, the shortest cycle is the preferred cycle.

One embodiment of the present invention is a method, for determining a network topology. This method is preferably the ring placement algorithm described herein. In its preferred embodiment, the ring placement algorithm determines where to place rings based upon a strong community of interest (COI) among points in the network. In other words, the COI is a value that quantifies a pattern of communication between a plurality of nodes.

The COI between a set of points in a network is a score based on either an established, or an expected, pattern of communication among those points. The COI is computed for a set of demands. Each demand in the set contributes to the COI. For example, given three nodes, A B and C, if there is a demand between A and C, then the set of nodes (ABC) will have a greater COI than if there was no demand between A and C.

The COI is a function of a demand quantity for a demand, a distance between endpoints of the demand, and a number of endpoints that the demand has in common with other demands in a set of demands. The basic COI function is:

$$COI_{Basic} = \frac{\text{demand quantity}}{2(\text{distance between the demand endpoints})^2}$$

When computing the COI for a single demand:

$$COI = 1.1(COI_{Basic})$$

When computing the COI for more than a single demand:

(A) If both demand endpoints are in common with other demand endpoints in the set, then $$COI = 3(COI_{Basic})$$

(B) If only one demand endpoint is in common with other demand endpoints in the set, then $$COI = 2 (COI_{Basic})$$

(C) If no demand endpoints are in common with other demand endpoints in the set, then $$COI = COI_{Basic}$$

In SONET, the multiplexing equipment is known as an add/drop multiplexer (ADM). To place a ring using SONET technology can thus be defined as determining a set of nodes where the ADMs will be located. In addition, the SONET rings can have varying capacities depending upon the type of ADM used. The capacity of the ring determines the amount of demand that can be carried by the ring. Furthermore, different types of ADMs have different corresponding costs, which effect the cost of establishing a ring.

By examining the network traffic patterns among the points in the network, the algorithm determines which points are suitable for unidirectional rings and which are more suited to exploit the characteristics of bi-directional rings. The capacity for each ring is then determined based on the forecasted demand that will ride through each ring. In addition, a buffer capacity is defined that will remain spare on every ring. This spare capacity on the rings can be used to allow for future growth.

The ring placement algorithm of the present invention can be tailored for different styles of planning that may exist in a telecommunications company's diverse network. For example, the process of planning rings for a rural area can be very different than for a metropolitan area due to the different traffic patterns and different average distances between central offices in the rural area as compared to the metropolitan area. Such differences become increasingly prevalent as a geographic areas encompassed by merging companies grow. The ring placement algorithm is customized through user-defined parameters. One such parameter is the spare capacity discussed above. Other parameters include thresholds such as a maximum number of repeaters allowed on a ring, a maximum length of a fiber cycle for a ring, and a maximum number of points on the ring, to name a few.

As stated earlier, rings are a relatively new technology. Measures for what constitute a good solution to a ring placement problem are not yet well established. One consideration of a good solution is a strong community of interest. Another consideration is that the functionality of available ring equipment is evolving. The ring placement algorithm is flexible in that it allows for a consideration of different parameters when determining what makes one solution better than another, and it also allows for different styles of planning as equipment functionality changes.

The ring placement algorithm of the present invention employs a combination of Artificial Intelligence (AI) techniques to the ring placement problem. It uses a combination of "weak" and "strong" AI methods. A "weak" method is one that is generally applicable in several kinds of problems. The advantage of a weak method is that it provides a great deal of flexibility, but its downfall is that it cannot exploit characteristics of a specific problem domain. A "strong" method is a problem solving technique with the opposite characteristics. A strong method takes advantage of what is known about a specific problem. The disadvantage of a strong method is that it is not generally applicable across different types of problem domains.

A state space search, which is a weak method of AI, provides such flexibility. In a state space search, the essential characteristics of what differentiates one partial solution from another are captured in what is called a "state" of the solution. The algorithm progresses from one state to the next by making two decisions, (1) selecting a demand to add to a solution, and (2) selecting a ring to which the demand can be added. The ring to which the demand can be added may be an existing ring, or the algorithm could start a new ring with the selected demand. One state can lead to many other states. The algorithm uses a best first search technique to guide the search through possible states.

The algorithm also employs an "evaluation function" that measures a "goodness" of a partial solution of a state. Then, the algorithm selects the state with the best value according to the evaluation function and tries to add a demand to the state. This continues until a solution is found that meets all the given demands, or as many of the demands as possible.

The evaluation function includes one or more parameters that are indicative of a value of a potential solution. Such parameters include, but are not necessarily limited to:

(a) a depth at which the potential solution is located in a state space search tree;

(b) a number of requirements that are skipped by the potential solution;

(c) a community of interest (COI) value that quantifies a pattern of communication between a plurality of nodes in the network, as proposed by the potential solution;

(d) a node hop, that is, an average number of intermediate nodes along various paths between endpoints, as proposed by the potential solution, (e) a cost of the potential solution, (f) a number of rings in the potential solution, (g) a number of repeaters required by the potential solution, (h) a number of new fiber optic cables required by the potential solution, (i) a cost of new fiber optic cables required by the potential solution, and (j) a length of new fiber optic cables required by the potential solution.

The community of interest (COI) is used in two ways: (1) when selecting a demand to add to a solution, and (2) when determining a state to which to progress. When selecting a demand to add to a solution, the demand having the highest aggregate COI is selected. The aggregate COI of a demand is computed by taking the demand, determining each potential ring assignment (including starting a new ring), computing the COI of each potential ring, and summing the COIs of all the potential rings. When determining a state to which to progress, the method progresses to the state having the highest COI. The COI of a state is the sum of the COIs of each ring in the state.

Figure 2:
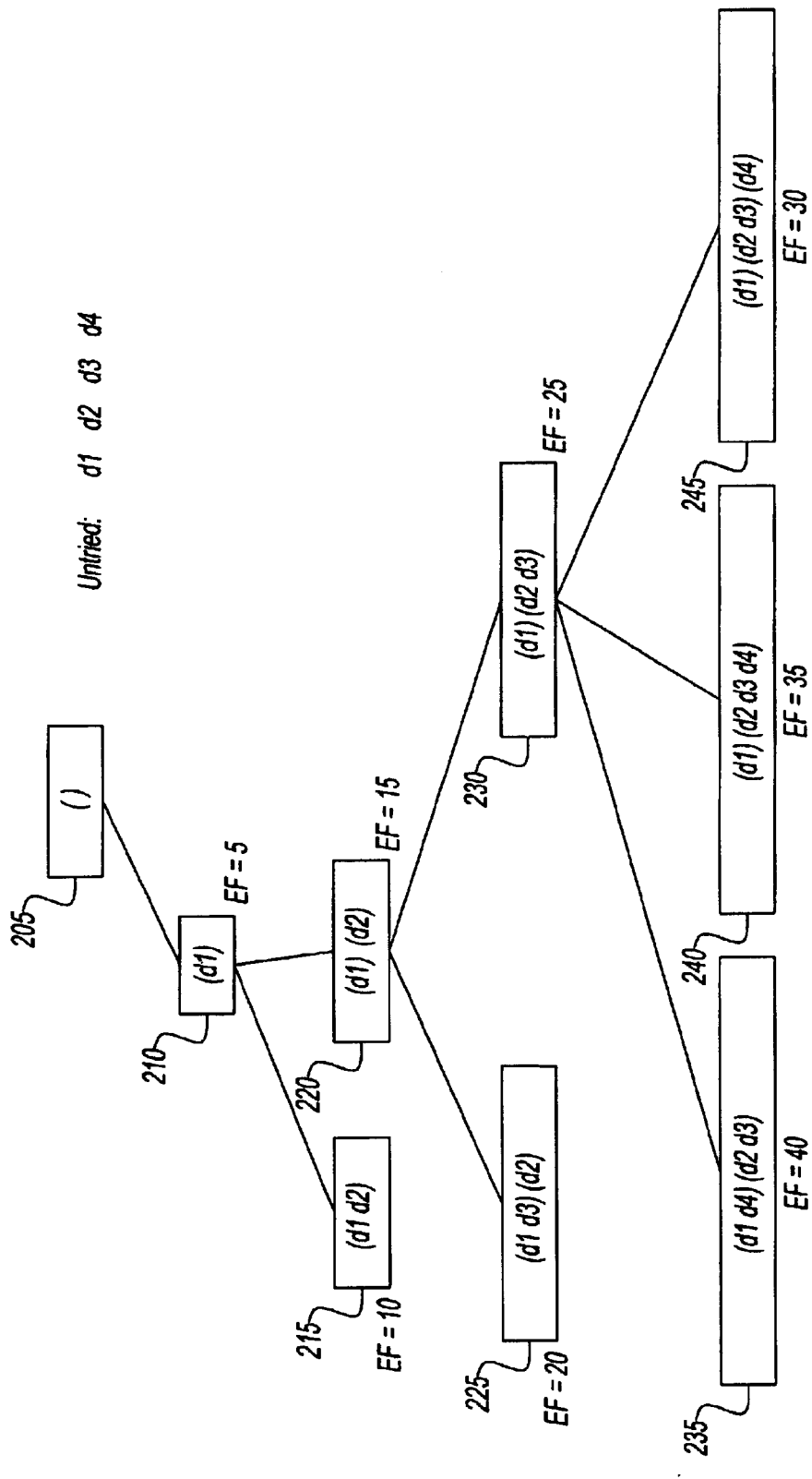
FIG. 2 is a diagram of a state space search tree of a type that is conceptually employed by the present invention to define a network topology.

FIG. 2 is a diagram of a state space search tree of a type that is conceptually employed by the present invention to define a network topology. The objective of the search is to define a state that provides a solution for a set of demands. However, in a practical application, the solution might only be a partial solution, that is, an adequate, yet less than optimum, solution.

The search tree of FIG. 2 illustrates the process by which a solution state is defined for four given demands, i.e., d1, d2, d3 and d4. The search beings with state 205.

State 205 is an initial state. No demands have been tried, and no demands have been satisfied. One of the demands, in this case demand d1, is selected for consideration. The demand that is selected is the one having the highest aggregate COI. The details of calculating the aggregate COI are presented in a later example. From state 205, the search progresses to state 210.

In state 210, demand d1 is satisfied. In the context of ring placement, the satisfaction of a demand represents the assignment of the demand to a ring. Hence, demand d1 is shown as a single demand between a pair of parenthesis, i.e., "(d1)", where demand d1 is in a ring of its own.

The process now considers how demand d2 can also be satisfied. As shown in state 215, demand d2 can be added to the existing ring with demand d1, thus forming a ring "(d1 d2)", or as shown in state 220, it can be added as another independent ring, thus yielding two rings, "(d1) (d2)".

The decision of whether to advance from state 210 to state 215, or to state 220, is based on the value of an evaluation function (EF). For this example, the elements of the EF are not specifically defined, but instead, at each state a quantity is merely assigned to represent a corresponding EF. So, for example, state 215 has an EF=10, and state 220 has an EF=15. Since the EF for state 220 is greater than the EF for state 215, the process advances from state 210 to state 220.

State 220 defines a solution with two independent rings, "(d1) (d2)". The process considers adding demand d3. From state 220, the process can advance either to state 225, which has an EF=20, or to state 230, which has an EF=25. Since the EF for state 230 is greater than the EF for state 225, the process advances to state 230.

State 230 defines a solution having a first ring "(d1)" and a second ring "(d2 d3)". The process considers adding demand d4. From state 230, the process can advance to one of states 235, 240 or 245. State 235 has an EF=40, state 240 has an EF=35, and state 245 has an EF=30. Since state 235 has the greatest EF of the three options, the process advances to state 235.

State 235 defines a solution with a first ring "(d1 d4)" and a second ring "(d2 d3)". Thus, all four demands are satisfied.

The ring placement algorithm uses the evaluation function to explore and refine the measure of the community of interest. In addition, as equipment functionality changes, a network designer can modify the evaluation function to redefine the parameters that constitute a good solution.

In a large problem domain, the weak AI method, if used alone, would attempt to evaluate more states then are practically feasible. That is, if a conventional computer were to execute a program that used the weak AI method to evaluate a large problem domain, the execution time could be unacceptably long. Accordingly, the ring placement algorithm of the present invention uses domain constraints, a strong method of AI, to eliminate many states whose solutions are not practical or feasible. One set of constraints allows us to decompose the problem into smaller sub-problems, which reduces the possible combination of demands. A second set of constraints exploits network characteristics and planning guidelines that limit the number of feasible solutions. The number of potential solutions is directly related to the number of demands under consideration. When the demands are subdivided into smaller, related subsets, which are then placed onto rings by separate independent searches, the size of each separate solution space is much smaller than that of one large search.

The ring placement algorithm of the present invention excludes a potential solution that violates a domain constraint. Such domain constraints include, but are not necessarily limited to:

(a) limiting the topographic location of a node to a bi-connected portion of the network;

(b) limiting a number of nodes allowed on a ring in the network;

(c) limiting a number of repeaters allowed on a ring in the network;

(d) limiting a cost of the-solution;

(e) limiting a length of a fiber cycle in the network; and (f) limiting a usage of available capacity.

The problem set can be subdivided, for example, by considering only demands within the bi-connected portions of the fiber optic network. A portion of the network is bi-connected if there exist two distinct paths between each pair of nodes in that portion of the network. Each ring must have a corresponding non-overlapping cycle in the fiber optic network that covers, at a minimum, each point of the ring. Such a cycle can exist only where the fiber optic network is bi-connected. Therefore, the algorithm computes the bi-connected components of the fiber optic network and subdivides the search by considering only demands whose endpoints lie within the same bi-connected component.

The second set of constraints used by the algorithm includes network characteristics and planning guidelines that reduce the number of feasible solutions due to cost or other engineering considerations as follows:

(i) There is a practical limit to the number of points allowed on a single ring that is lower than the theoretical limit. While the theoretical limit is high, planners can set a practical limit to keep the size of the rings from becoming non-feasible to build. This practical limit disallows solutions where the number of unique endpoints of the demands under consideration exceeds the number of points allowed. This also allows planners to control the costs where repeaters are often unnecessary such as in metropolitan areas, but still allows for this additional cost when it is necessary such as in rural areas.

(ii) There is also a physical limit to distance over which a signal can be carried between points on the ring. The signal can be enhanced with repeaters, but there is an additional cost incurred with each repeater. Therefore, the number of repeaters allowed on each ring is also limited. This constraint eliminates the need to consider combinations of demands that result in rings that span distances that are too large to be feasible.

(iii) Another cost consideration is the cost of the solution as a whole. Since the cost of a solution is approximated by the cost of the equipment, i.e., an ADM required at each point of the ring, and an ADM is needed for each unique endpoint from the demands assigned to a ring, the cost of a solution increases or remains the same with each additional demand carried by the solution. Thus, cost monotonically increases with the number of demands carried by the solution. If an acceptable solution must be within a given cost, the algorithm can use a branch and bound search based upon cost. In other words, once the algorithm finds a solution that exceeds the given cost, it does not need to look at any more solutions that include that same assignment of demands to rings. To see why this is true, consider the following two possibilities that exist for assigning additional demands to this solution. Either (1) a new demand can be added to one of the rings in the solution, or (2) a new demand can be assigned to a new ring not currently in the solution. Adding a demand to an existing ring cannot reduce the number of ADMs needed by that ring, and adding a demand to a new ring will add two ADMs required by the solution. Thus, the addition of a new demand to this solution can never decrease the cost of the solution.

A cycle is a non-overlapping path through a network, whose beginning and ending points are the same. In order for a ring to be placed in a fiber network, a cycle must exist. The ring placement algorithm pre-computes the cycles in the fiber network before attempting to place rings. The maximum length of a fiber cycle is controlled through a user-defined parameter. In this manner, the number of cycles that must be considered is lowered in metropolitan areas where long fiber cycles are probably unnecessary. On the other hand, planners in rural areas can increase this parameter to allow for a longer distance that may need to be covered in order to complete a cycle for a ring.

The algorithm can also be customized through the use of a parameter that controls the maximum usage of available capacity, or conversely, the amount of spare buffer capacity built into a ring. The capacity of the ring, for example, the capacity defined by an optical carrier (OC) rate, is determined from a forecasted demand for the ring. The forecast number is an approximation of the quantity of demand that will exist in the future. As such, forecasted demand is not meant to be a precise indicator for an exact amount of bandwidth that should be provided. Therefore, the buffer capacity can be used to offset the difference between the forecast and the bandwidth that planners feel comfortable providing to meet the forecast. Another use of the buffer capacity is to allow for future growth on the ring. Depending on the planning style, a planner may not want to fill a ring to capacity as soon as it comes on line. Rather, the planner may wish to balance future growth against currently unused bandwidth. This can be accomplished through the spare buffer capacity.

Figure 3:
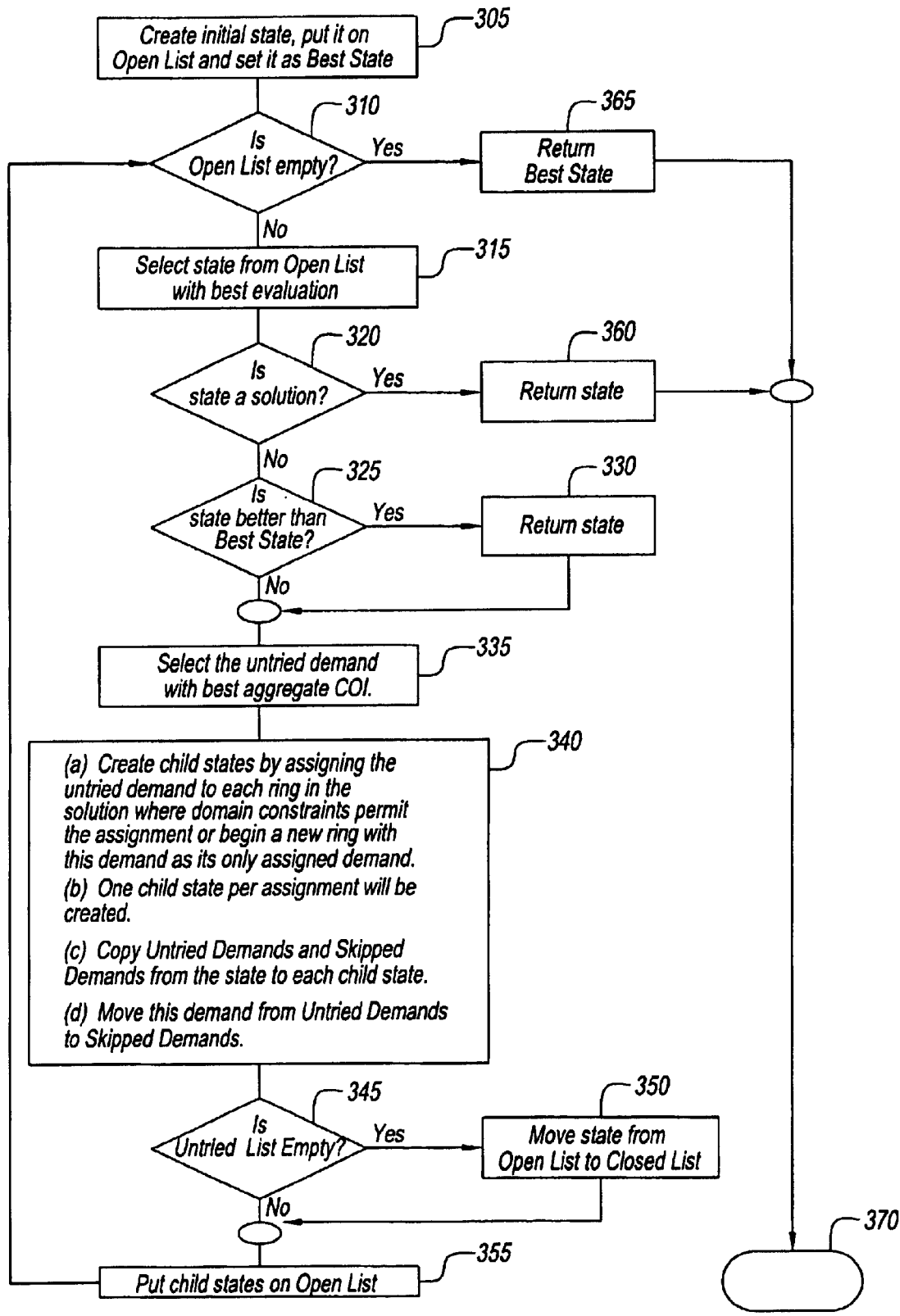
FIG. 3 is a flowchart of a method for determining a network topology in accordance with the present invention.

FIG. 3 is a flowchart of a method for determining a network topology, i.e., the ring placement algorithm, in accordance with the present invention. Below, FIG. 3 is first described in general terms, and thereafter, an example is worked through in detail.

The method receives data that describes a demand, i.e., a requirement, for a service between a first node and a second node; and searches a state space to define a solution that fulfills the requirement. The solution provides a topographic arrangement for the first node and the second node in the network. The method is suitable for determining the topology of a network in which the topographic location can be a ring in the network. More specifically, in the situation where a plurality of nodes must be placed, the method places each of the nodes into one or more rings in the network. The method is suited for placing rings in a SONET ring network or a Dense Wave Division Multiplexing (DWDM)/Optical ring network. However, the method is not limited to any particular network technology.

The method uses five data structures, namely an Open List, a Best State, an Untried Demands List, a Skipped Demands List, and a Closed List.

The Open List is a list of states that have been created but not yet fully examined, and are thus candidates for the final solution or candidates that may yet lead to the creation of a state which is the final solution.

The Best State identifies the state that the method has thus far determined to be the most favorable solution.

The Untried Demands List is a list of demands that have yet to be considered for a particular state. Each state that is created has its own Untried Demands List.

The Skipped Demands List is a list of demands that cannot be accommodated by a particular state. Each state has its own Skipped Demands List.

The Closed List is a list of states, each of which have defined a solution that has been fully examined and is not a solution.

The method begins with step 305.

In step 305, the method creates an initial state, puts it on the Open List and sets the Best State to indicate the initial state. The initial state also has an Untried Demands List, which includes all the demands that are to be considered. For an example, see FIG. 4.

In step 310, the method determines whether the Open List is empty. If the Open List is not empty, then the method advances to step 315. If the Open List is empty, then the method branches to step 365.

On the first pass, in state 305 the initial state was put on the Open List; the Open List is not empty, and therefore the method will advance to step 315.

In step 315, the method selects, from the Open List, the state with the best evaluation function. This state is now regarded as the state under consideration. The method then advances to step 320.

On the first pass, the initial state is the only state on the Open List, and therefore the initial state is the state under consideration.

In step 320, the method determines whether the state under consideration is a solution. A state is a solution if the Untried Demands List is empty, and the Skipped Demands List is empty. If the state under consideration is not a solution, then the method advances to state 325. If the state under consideration is a solution, then the method branches to state 360.

On the first pass, the initial state is the state under consideration; it is not a solution, and therefore the method advances to step 325.

In step 325, the method determines whether the state under consideration is better than the Best State. A state is better than the Best State if it satisfies more demand (regardless of cost) or if it satisfies the,same amount of demand for less cost. If the state under consideration is not better than the Best State, then the method advances to step 335. If the state under consideration is better than the Best State, the method branches to step 330.

On the first pass, the initial state is the state under consideration and it is also the Best State; it is not better than the Best State, and therefore the method advances to step 335.

In-step 330, the method sets the state under consideration as the Best State. The method then advances to step 335.

In step 335, for the state under consideration, the method selects, from the Untried Demands List of the state under consideration, the untried demand with the best aggregate community of interest (COI). The method then advances to step 340.

In step 340, the method creates one or more child states subordinate to the state under consideration. The child states are created by assigning the untried demand that was selected in step 335 to (1) each existing ring in the solution, where permitted by domain constraints, and (2) a new ring, where this untried demand is the only assigned demand, where permitted by domain constraints. The method creates one child state per assignment.

For example, referring back to FIG. 2, state 230 defined a first ring "(d1)" and a second ring "(d2 d3)", and demand d4 was considered for addition to the solution. Demand d4 was added to the first ring, thus creating state 235 having two rings, "(d1 d4) (d2 d3)". Demand d4 was added to the second ring, thus creating state 240 having two rings, "(d1) (d2 d3 d4)". Demand d4 was added as a new ring, thus creating state 245 having three rings, "(d1) (d2 d3) (d4)".

Also in step 340, the method copies the Untried Demands List and the Skipped Demands List, from the state under consideration to each child state, and moves the demand that was selected in step 335 from the Untried Demand List to the Skipped Demand List. This allows for the Skipped Demands to be copied for any subsequent child states that are created if the state under consideration is revisited. The method then advances to step 345.

In step 345, the method determines, for the state under consideration, whether the Untried Demands List is empty. If the Untried Demands List for the state under consideration is not empty, then the method advances to step 355. If the Untried Demands List for the state under consideration is empty, then the method advances to step 350.

In step 350, the method moves the state under consideration from the Open List to the Closed List. The method then advances to step 355. This move signifies that the state under consideration has been examined to determine whether it is a Solution State or the Best State, and that all its possible child states have been created. Therefore, there is no more processing to be done for this state, and it should not be revisited.

In step 355, the method puts onto the Open List, all of the child states that were created in step 340. The method then loops back to step 310.

In step 360, the method returns, as the solution, the state under consideration. The method then advances to state 370.

In step 365, the method returns, as the solution, the Best State. The method then advances to step 370.

In step 370, the method for determining a network topology ends.

Note that if at state 320 the method determines that the state under consideration is a solution, then the method advances to state 360 where it returns, as the solution, the state under consideration. In other words, the method represented in FIG. 3 does not necessarily return the best possible solution, but rather, a satisfactory solution, that is, a solution for which there are no untried demands and no skipped demands.

The number of states that must be explored for a problem of any non-trivial size to find the best state is too large to be completed in a reasonable amount of time. However, if one wishes to employ the present invention to obtain a best possible solution, then steps 320 and 360 should be deleted. That is, the method should advance from step 315 to step 325. Accordingly, the only remaining path by which the method can be terminated will be via step 365, which returns, as the solution, the Best State.

FIGS. 4 through 11 are diagrams of an exemplary state space search tree, evolving as various states are considered. This example illustrates some of the situations that can be handled by the method of the present invention, as set forth in the flowchart of FIG. 3. Accordingly, the following narrative frequently refers back to the steps of FIG. 3.

Table 2, below, specifies a set of demands for the network shown in FIG. 1.

TABLE 2

DEMANDS FOR NETWORK SHOWN IN FIG. 1

| Demand | Endpoints | Demand Quantity (VT1.5 circuits) |
| --- | --- | --- |
| d1 | A-B | 10 |
| d2 | A-C | 23 |
| d3 | B-C | 5 |
| d4 | B-E | 12 |
| d5 | B-F | 20 |
| d6 | D-E | 21 |
| d7 | E-F | 15 |

Table 2 shows, for example, that demand d1 requires a capacity of 10 VT1.5 (Virtual Tributary 1.5 Mbyte) circuits between points A and B (15 megabytes (Mbytes) per second). Note that the units of demand are unimportant as long as they are consistent among the demands. VT1.5 circuits are only exemplary, and they are shown is this example merely for convenience.

Figure 6:
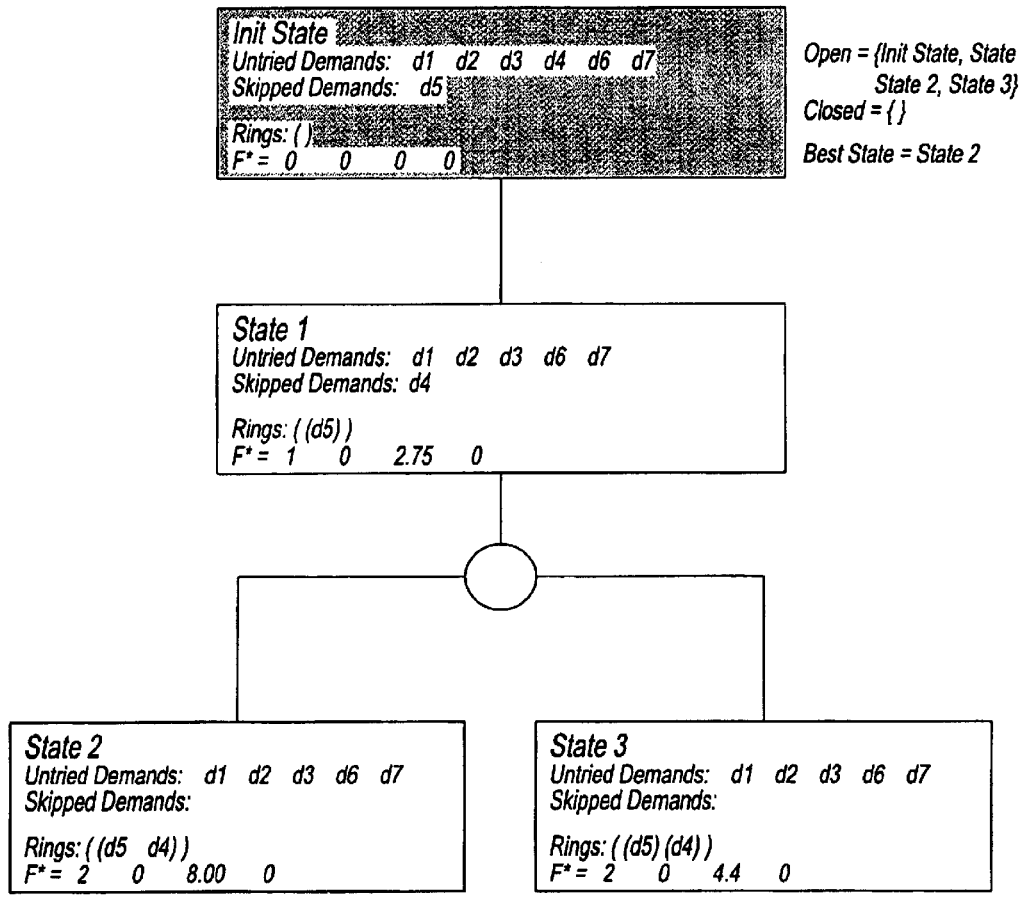

Refer to FIG. 6 as the following terminology is explained. A state, such as state 3, is represented as a box.

Each state holds information regarding (a) the demands that have not been assigned to a ring, i.e., untried demands (b) the sets of rings in the solution so far, and (c) the value for the state given by the evaluation: function F*. In state 3, the untried demands are d1, d2, d3, d6 and d7, and no demands have been skipped.

Rings are represented by the demands that will be assigned to them. Each set of demands grouped by parentheses represent a ring. State 3 has a first ring "(d5)" and a second ring "(d4)". In the initial state, i.e. Init State, no demands have been assigned, therefore there are no rings.

The evaluation function, F*, has four components: Depth, Skipped Demands, Community of Interest (COI), and Average Node Hop. When comparing the evaluation function F* of two states, the values of these different components are compared in the order presented until the value of a component in one state is better than the same component in the second state. That is, the components of the evaluation function F* are considered in the order of Depth, Skipped Demands, Community of Interest (COI), and Average Node Hop.

Depth is the depth, or level, at which a state is located in the search tree. State 3 is at depth 2. A higher depth value is preferred. The deeper a state is located in the search tree, the more demands that have been assigned to rings, and presumably the closer the state is to a solution.

Skipped Demands are the number of demands that have been foregone by the state. State 3 has 0 skipped demands. A lower value of skipped demands is preferred, because then more demands will be in the final solution.

Community of Interest (COI) is the sum of the COIs of each ring in the state. State 3 has a COI of 4.4. The details of how this value is calculated are presented later. A higher COI value is preferred, because a stronger COI leads to a better demand assignment to rings. This is because COI is a measure of the interrelationship between a set of demands. The more interrelated are a set of candidate demands, the more efficiently utilized will be the ring. Where endpoints have a greater COI, they also have a greater propensity to be placed into a ring together.

Average Node Hop is the average number of intermediate nodes per ring through which the assigned demands will pass. State 3 indicates 0 average node hops. This can be computed by looking at each ring and finding the minimum length cycle in the fiber network (see FIG. 1) that includes all the endpoints of the demands assigned to that ring. For the ring with demand d4 assigned to it, the cycle would be B-E-F-B. The demand endpoints of demand d4 are B and E, and thus there are 0 intermediate nodes on this cycle between B and E. Likewise for the ring with demand d5 assigned to it, the same cycle would be used and since there are no intermediate nodes between B and F on this cycle, the node hop for this ring is 0 as well. Thus, the average node hop for State 3 is 0. A lower node hop value is preferred because it indicates a traffic pattern better suited for a bi-directional ring. Bi-directional rings are preferred because they have the potential to satisfy more demands per cost of the ring than unidirectional rings when the number of pass through nodes is low.

A line in a downward direction connecting an upper state to one or more lower states, represents that the upper state is a parent of the one or more lower, child states. In FIG. 6, State 1 is a parent of child states 2 and 3.

Figure 11:
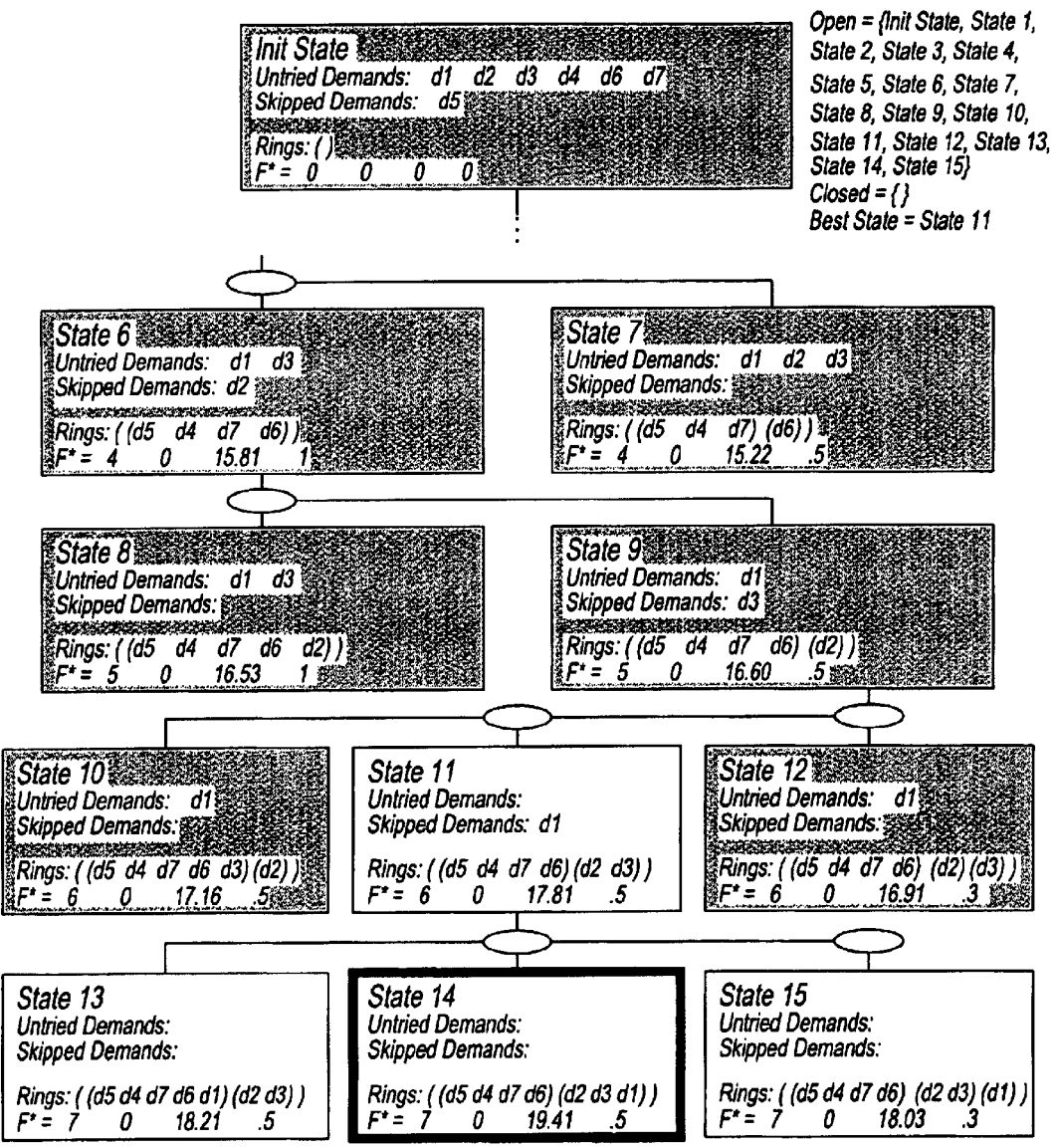

The solution state of the following example is represented in FIG. 11 as a bold box.

Refer again to the flowchart of FIG. 3, and to the first state space search diagram illustrated by FIG. 4. In step 305, the method creates an initial state, puts it on the Open List and sets the Best State to indicate the initial state. In FIG. 4, the Init State is shown with all demands listed as Untried Demands, no Skipped Demands, no rings created, and all of the components of F* equal to 0. The Open List contains the Init State, the Closed List is empty, and the Best State indicates the Init State. The method then advances to step 310.

First Pass:

In step 310, the method determines whether the Open List is empty. In FIG. 4, the Open List is not empty, therefore, the method advances to step 315.

In step 315, the method selects, from the Open List, the state with the best evaluation function. From FIG. 4, the Init State is selected from the Open List, and the Init State is now regarded as the state under consideration. The method then advances to step 320.

In step 320, the method determines whether the Init State is a solution. As shown in FIG. 4, the Init State includes Untried Demands, and it is therefore not a solution. The method then advances to step 325.

In step 325, the method determines whether the Init State is better than the Best State. As shown in FIG. 4, the Init State is equal to the Best State, therefore the method advances to step 335.

In step 335, for the state under consideration, the method selects, from the Untried Demands List, the untried demand with the best aggregate community of interest (COI). The aggregate COI of a demand is computed by taking the demand, determining each potential ring assignment (including starting a new ring), computing the COI of each potential ring, and summing the COIs of all the potential rings. In this case, the only potential ring assignment for each demand is to start a new ring. Therefore, the method computes the COI=1.1COI$_{Basic}$ for each demand.

For example, the aggregate COI for d1 is:

Aggregate COI=1.1COI$_{Basic}$, $$\text{Aggregate } COI = \frac{1.1 * 10}{2 * 5^2}$$

Aggregate COI=0.22

Table 3 lists the value of aggregate COI computed for each Untried Demand in the Init State.

TABLE 3

AGGREGATE COI FOR UNTRIED DEMANDS IN THE INIT STATE

| Demand | Aggregate COI |
| --- | --- |
| d1 | 0.22 |
| d2 | 0.79 |
| d3 | 0.31 |
| d4 | 1.65 |
| d5 | 2.75 |
| d6 | 0.726* |
| d7 | 0.91 |

The distance used in the COI computation is the geographic distance between the demand endpoints. The: distance between D and E is 4. This was not readily apparent from the network diagram in FIG. 1, so we supply it here.

In the Init State, demand d5 has the best aggregate COI, therefore, demand d5 is selected. The method then advances to step 340.

In step 340, and as shown in FIG. 5, the method creates a child State 1, subordinate to the Init State. The Init State has no existing rings, therefore demand d5 is assigned to a new ring. The method copies the Untried Demands from the Init State to State 1 and moves the demand selected in step 335 from the Untried Demand List to the Skipped Demand List. FIG. 5 shows that in the Init State, demand d5 is included as a Skipped Demand. The method then advances to step 345.

In step 345, the method finds that in the Init State the Untried Demands List is not empty. Accordingly, the method advances to step 355.

In step 355, the method puts State 1 onto the Open List. As indicated in FIG. 5, the Open List includes State 1. The method then loops back to step 310.

Second Pass:

In step 310, the method finds that the Open List is not empty. The method then advances to step 315.

In step 315, the method selects, from the Open List, the state with the best evaluation function. The Open List includes the Init State and State 1. The method compares the Depth of the Init State, to the Depth of State 1. The Depth of the Init State is 0, and the Depth of State 1 is 1. The evaluation function of State 1 is superior, therefore, the method selects State 1 from the Open List. State 1 is now the state under consideration. The method then advances to step 320.

In step 320, the method determines whether State 1 is a solution. As shown in FIG. 5, State 1 includes Untried Demands, and it is therefore not a solution. The method then advances to step 325.

In step 325, the method determines whether State 1 is better than the Best State. Recall that in step 305, the Best State was set to indicate the Init State, and that designation has not yet been changed. Accordingly, the method compares the evaluation functions of the Init State and State 1. State 1 is better than the Init State because State 1 meets more demand. The method then advances to step 330.

In step 330, the Best State is set to indicate State 1, as shown in FIG. 5. The method then advances to step 335.

In step 335, the method selects from the Untried Demands of State 1, the demand with the best aggregate COI. Computing the aggregate COI of an Untried Demand involves computing, and then summing, the COI of each of its potential assignments. In State 1, there are two potential assignments for each Untried Demand, either with demand d5 on a single ring, or by itself as a new ring.

For example, the calculations for the aggregate COI of demand d1 in State 1 are as follows. Since demand d1 and demand d5 have one endpoint in common, that is, node B, the COI of a potential ring that includes both demand d1 and demand d5 is computed by multiplying each of their Basic COIs by 2.

The calculation for the potential ring of d1 on its own is:

Aggregate COI=1.1COI$_{Basic}$ $$\text{Aggregate } COI = \frac{1.1 * 10}{2 * 5^2}$$

Aggregate COI=0.22

The calculation for the aggregate COI of demand d1 in State 1 is:

$$Agg\ COI = COI((d5, d1)) + COI((d1))$$

$$= (2 * COI_{Basic}(d5) + 2 * COI_{Basic}(d1)) + 1.1 * COI_{Basic}(d1)$$

$$= \frac{2 * 20}{2 * 2^2} + \frac{2 * 10}{2 * 5^2} + \frac{1.1 * 10}{2 * 5^2}$$

$$= 5 + .4 + .22$$

$$= 5.62$$

Table 4 lists the value of aggregate COI for each United Demand in State 1.

TABLE 4

AGGREGATE COI FOR UNTRIED DEMANDS IN STATE 1

| Demand | Aggregate COI |
| --- | --- |
| d1 | 5.62 |
| d2 | 4.01 |
| d3 | 5.87 |
| d4 | 9.65 |
| d6 | 3.89 |
| d7 | 7.57 |

In State 1, demand d4 has the best aggregate COI. Therefore, demand d4 is selected. The method then advances to step 340.

In step 340, and as shown in FIG. 6, the method creates child states 2 and 3 subordinate to state 1. More specifically, given that State 1 had one existing ring "(d5)", the method adds demand d4 to the ring to create State 2 having a ring "(d5, d4)", and the method assigns demand d4 to a new ring, thus creating State 3 having two rings, "(d5) (d4)". The method also copies the Untried Demands from State 1 to each of States 2 and 3, and moves the demand selected in step 335 from the Untried Demand List to the Skipped Demand List. Note that demand d4 was moved from the Untried Demands of State 1 to the Skipped Demands of State 1. The method then advances to step 345.

In step 345, the method finds that in State 1 the Untried Demands List is not empty. Accordingly, the method advances to step 355.

In step 355, the method puts states 2 and 3 onto the Open List. As shown in FIG. 6, the Open List now includes the Init State, State 1, State 2 and State 3. The method then loops back to step 310 to execute a third pass.

Third and Subsequent Passes

The third and subsequent passes through the method, as charted in FIG. 3, proceed in a manner similar to that of the second pass, described above. The highlights of some of these passes are described below.

FIG. 6 shows that of the states on the Open List, State 2 has the most favorable evaluation function. More specifically, States 2 and 3 have a greater Depth than does State 1; and the COI of State 2 (8.00) is greater than the COI of State 3 (4.4). Accordingly, State 2 prevails, and the Best State is set to indicate State 2.

The COI for State 2 is calculated as follows. Note the demand d4 has endpoints of B and E, and that demand d5 has endpoints of B and F. Demands d4 and d5 have one common endpoint, i.e., endpoint B. Recall that when computing the COI for more than a single demand, if only one demand endpoint is in common with other demand endpoints in the set, then:

COI=2 (COI$_{Basic}$)

Accordingly, for State 2:

COI=COI((d4 d5))

COI=2*COI$_{Basic}$((d4))+2*COI$_{Basic}$((d4))

$$COI = 2 * \frac{12}{2*(2)^2} + 2 * \frac{20}{2*(2)^2}$$

The COI of State 3 is calculated as follows. First note that in State 3, each of demands d4 and d5 are in stand-alone rings. Recall that when computing the COI for a single demand:

COI=1.1(COI$_{Basic}$)

Accordingly, for State 3:

COI=COI((d4))+COI((d5))

COI=1.1*COI$_{Basic}$((d4))+1.1*COI$_{Basic}$((d5))

$$COI = 1.1 * \frac{12}{2*(2)^2} + 1.1 * \frac{20}{2*(2)^2}$$

COI=1.65+2.75

COI=4.4

Figure 7:
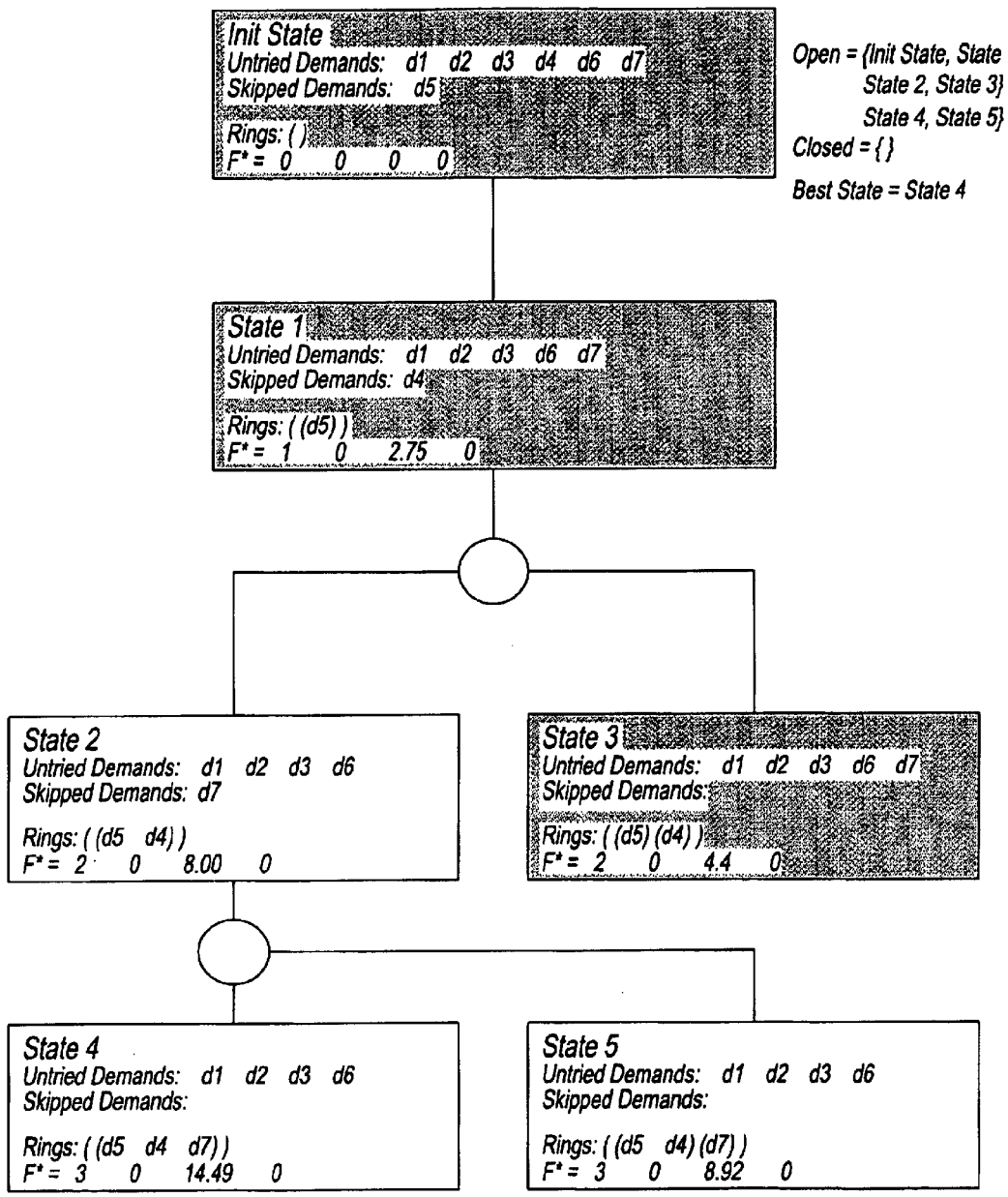

FIG. 7 shows that from State 2, demand d7 is selected and two child states are created, namely States 4 and 5. State 4 has one ring, "(d5 d4 d7)", and State 5 has two rings, "(d5 d4) (d7)". The Open List is updated to include the Init State, State 1, State 2, State 3, State 4 and State 5. State 4 is found to have the most favorable evaluation function (COI 14.49). The Best State is set to indicate State 4.

Figure 8:
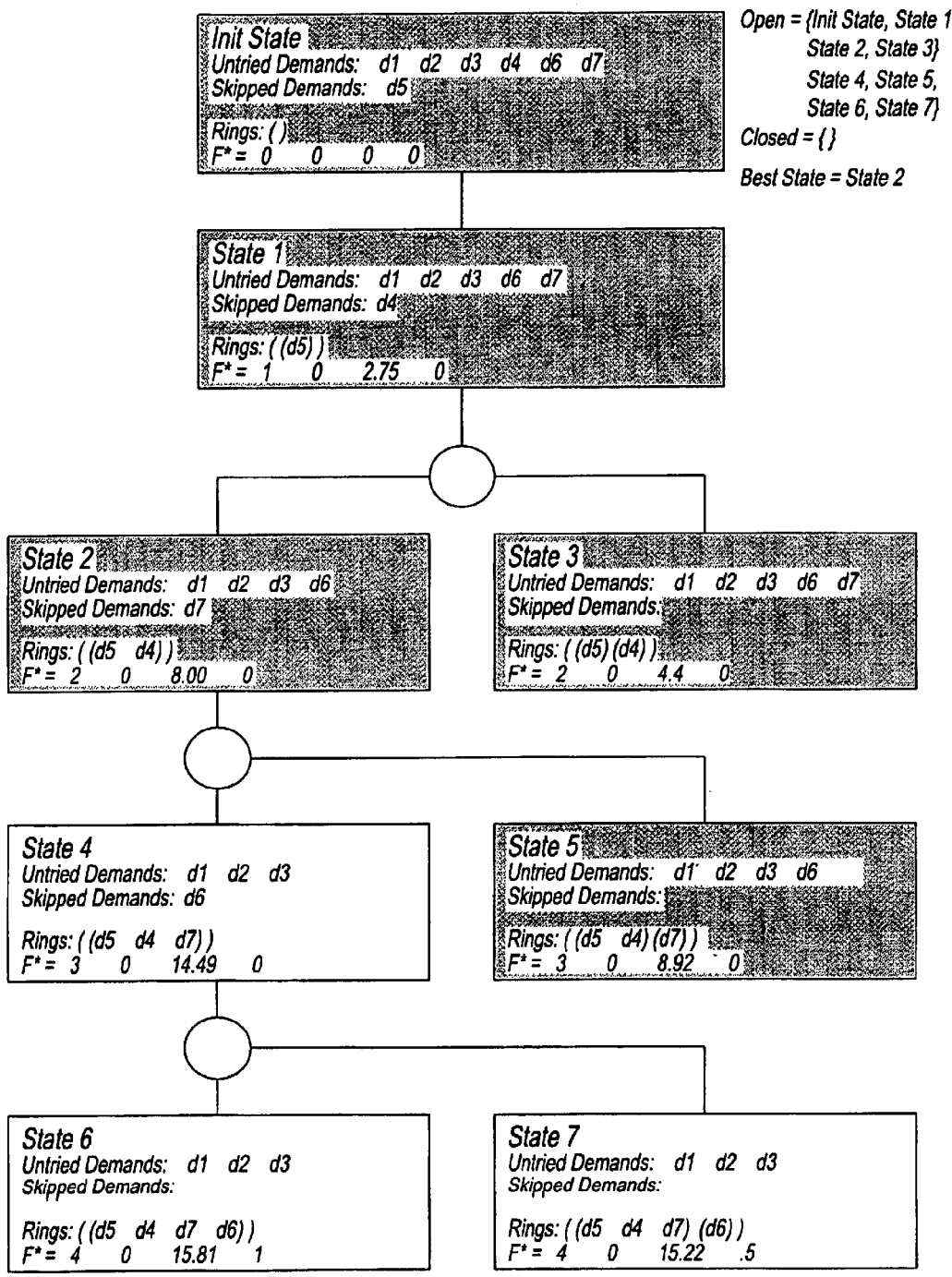

FIG. 8 shows that from State 4, demand d6 is selected and two child states are created, namely States 6 and 7. State 6 has one ring, "(d5 d4 d7 d6)", and State 7 has two rings, "(d5 d4 d7) (d6)". The Open List is updated to include the Init State, State 1, State 2, State 3, State 4, State 5, State 6 and State 7. State 6 has the most favorable evaluation function (COI=15.81). The Best State is set to indicate State 6.

Figure 9:
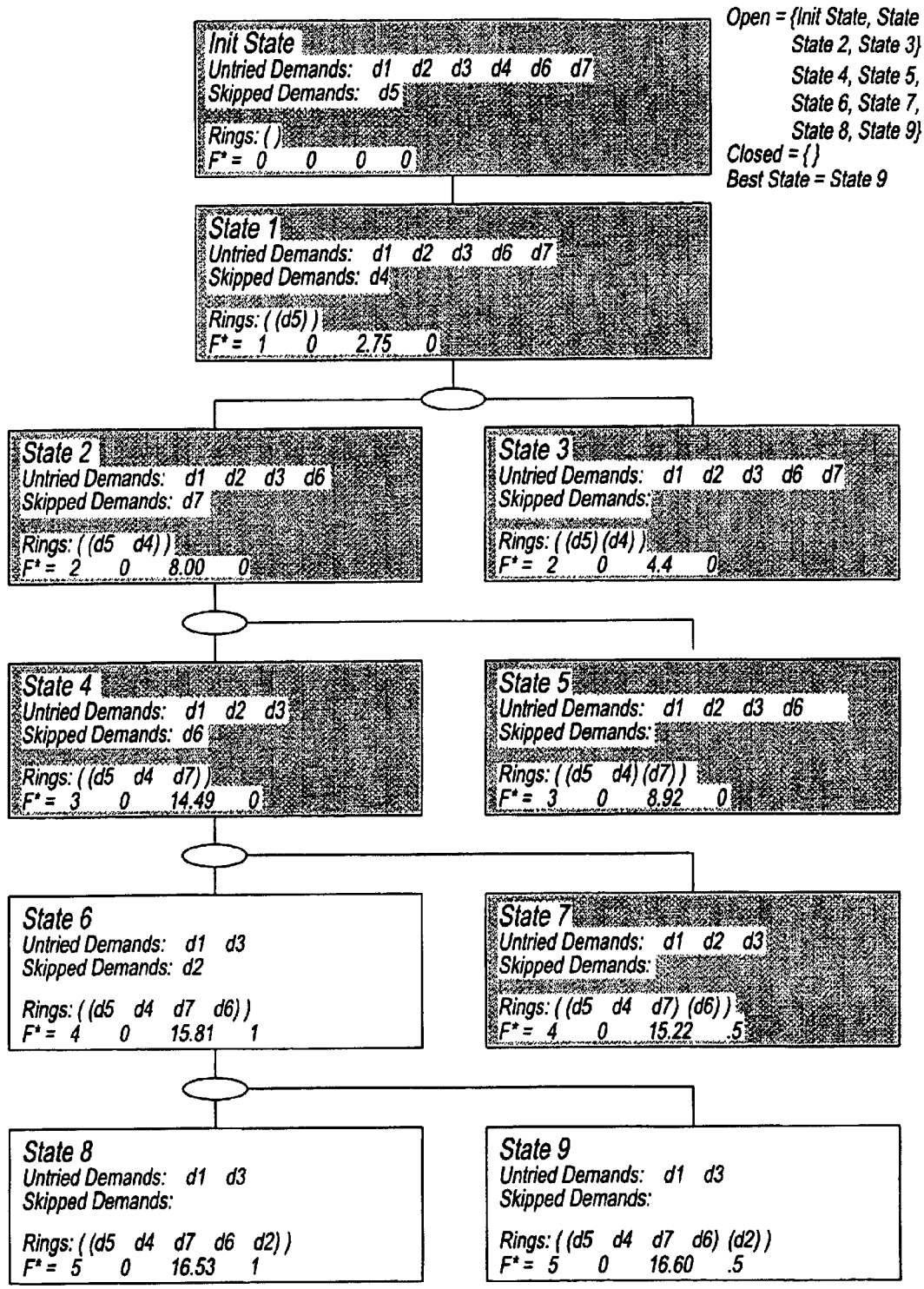

FIG. 9 shows that from State 6, demand d2 is selected and two child states are created, namely States 8 and 9. State 8 has one ring, "(d5 d4 d7 d6 d2)", and State 9 has two rings, "(d5 d4 d7 d6) (d2)". The Open List is updated to include the Init State, State 1, State 2, State 3, State 4, State 5, State 6, State 7, State 8 and State 9. State 9 has the most favorable evaluation function (COI=16.60). The Best State is set to indicate State 9.

The calculation of the COI for State 8 is more involved than the calculations presented in the earlier examples. The COI of a state is the sum of the COIs of each ring in the state. State 8 in FIG. 9 has a COI of 16.53 as calculated by taking the COI of the ring formed by the endpoints of demands d5, d4, d7, d6, d2. Each demand adds to the COI. Since both endpoints of d5, d4, and d7 are in common with the endpoints of other demands on the ring, their basic COIs are multiplied by 3. Only one endpoint of demand d6, namely E, is in common with any of the other endpoints, so its basic COI is multiplied by 2. The last demand, d2, has no endpoint in common with the other demands. Therefore, its basic COI, with no multiplier, is its contribution to the COI of the ring.

For State 8:

COI=COI((d5 d4 d7 d6 d2))

COI=3*COI$_{Basic}$(d5)+3*COI$_{Basic}$(d4)+3*COI$_{Basic}$(d7)+2*COI$_{Basic}$(d6)+COI$_{Basic}$(d2)

$$COI = \frac{3*20}{2*2^2} + \frac{3*12}{2*2^2} + \frac{3*15}{2*3^2} + \frac{2*21}{2*4^2} + \frac{23}{2*4^2}$$

COI=7.5+4.5+2.49+1.32+0.72

COI=16.53

Figure 10:
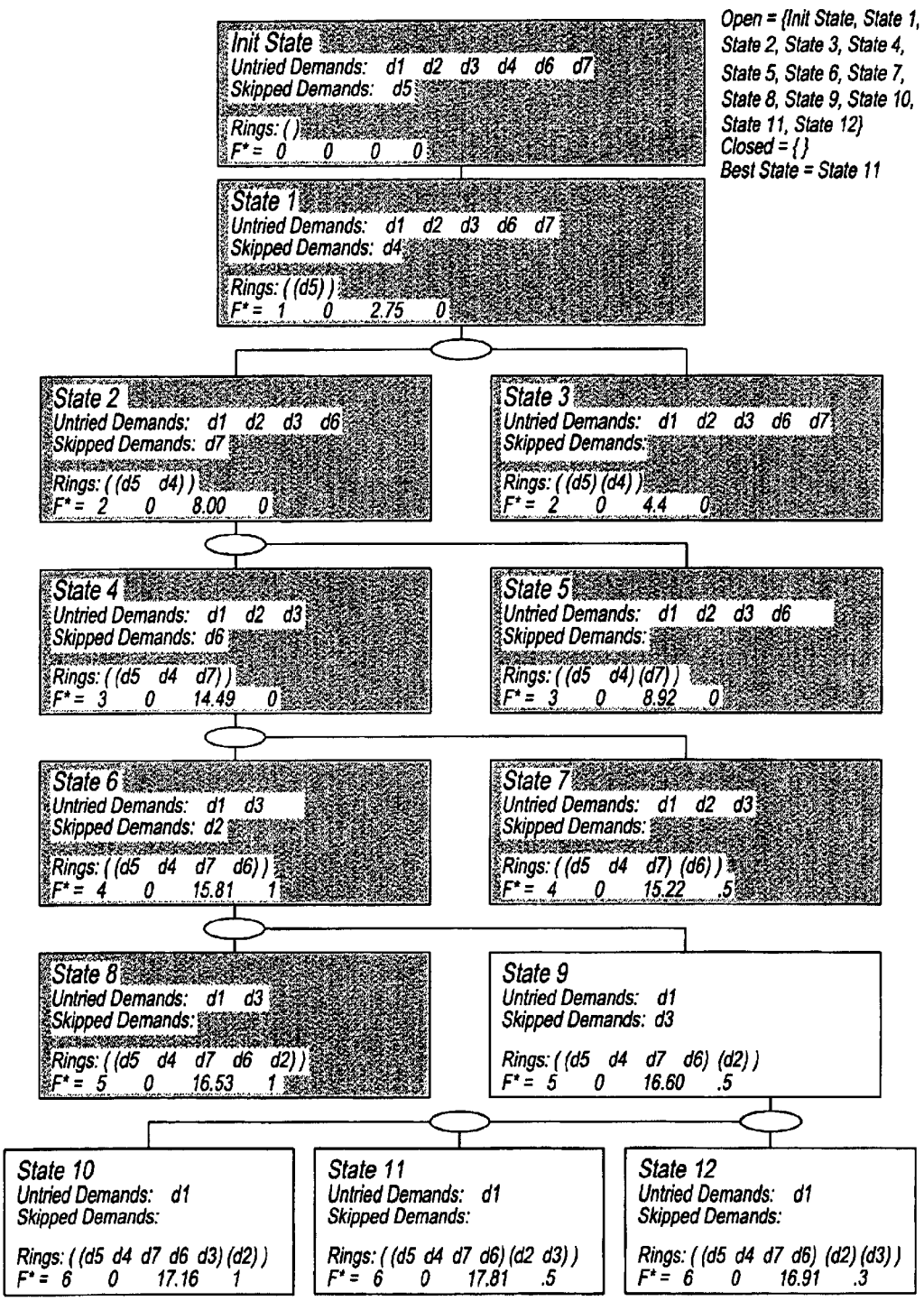

FIG. 10 shows that from State 9, demand d3 is selected and three child states are created, namely States 10, 11 and 12. State 10 has two rings, "(d5 d4 d7 d6 d3) (d2)", State 11 has two rings, "(d5 d4 d7 d6) (d2 d3)", and State 12 has three rings, "(d5 d4 d7 d6) (d2) (d3)". The Open List is updated to include the Init State, State 1, State 2, State 3, State 4, State 5, State 6, State 7, State 8, State 9, State 10, State 11 and State 12. State 11 has the most favorable evaluation function (COI=17.81). The Best State is set to indicate State 11.

FIG. 11 shows that from State 11, demand d1 is selected and three child states are created, namely States 13, 14 and 15. State 13 has two rings, "(d5 d4 d7 d6 d1) (d2 d3)", State 14 has two rings, "(d5 d4 d7 d6) (d2 d3 d1)", and State 15 has three rings, "(d5 d4 d7 d6) (d2 d3) (d1)". The Open List is updated to include the Init State, State 1, State 2, State 3, State 4, State 5, State 6, State 7, State 8, State 9, State 10, State 11, State 12, State 13, State 14 and State 15.

Final Pass

From this point, and referring again to the flowchart of FIG. 3, in step 310, the method determines that the Open List is not empty. The method then advances to step 315.

Figure 14:
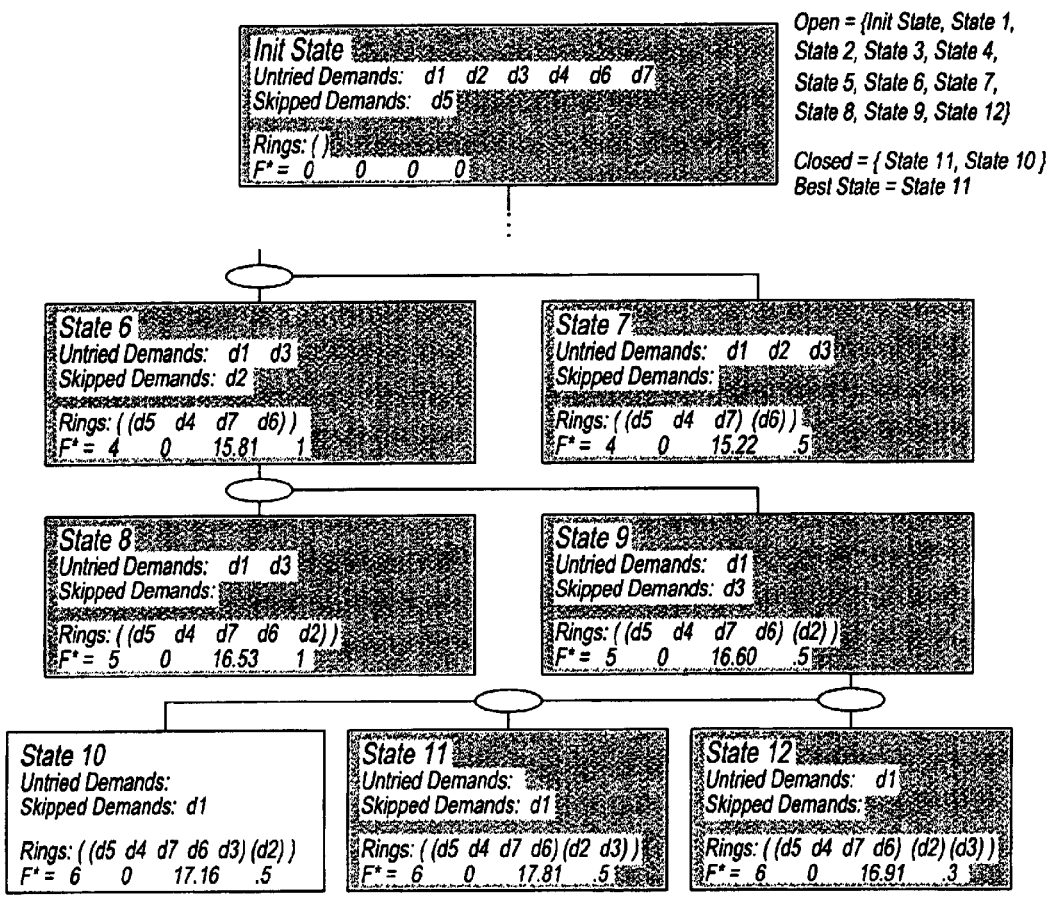

In step 315, the method selects, from the Open List, the state with the best evaluation function. As shown in FIG. 14, State 14 has the best evaluation function (COI=19.41). State 14 is now regarded as the state under consideration. The method then advances to step 320.

In step 320, the method determines whether State 14 is a solution. Recall that a state is a solution if it has no suntried demands and no skipped demands. As shown in FIG. 11, State 14 has no untried demands and no skipped demands. Thus, State 14 is a solution and the method branches to step 360.

In step 360, the method returns, as the solution, State 14. The method then advances to step 370.

In step 370, this example of the method for determining a network topology ends.

The solution state, State 14 has two rings, "(d5 d4 d7 d6) (d2 d3 d1)". From Table 2, which was presented earlier, the endpoints of the demands for the first ring, "(d5 d4 d7 d6)", correspond to a first set of endpoints (B-F, B-E, E-F,D-E), and the endpoints of the demands for the second ring, "(d2 d3 d1)", correspond to a second set of endpoints (A-C, B-C, A-B).

The endpoints from the first set of demands are reduced to (BFED) and the endpoints from the second set of demands are reduced to (ACB). Referring to FIG. 1, from the first set of endpoints a ring is formed as "(B D F E)", and from the second set of endpoints a ring is formed as "(A B C)".

Figure 12:
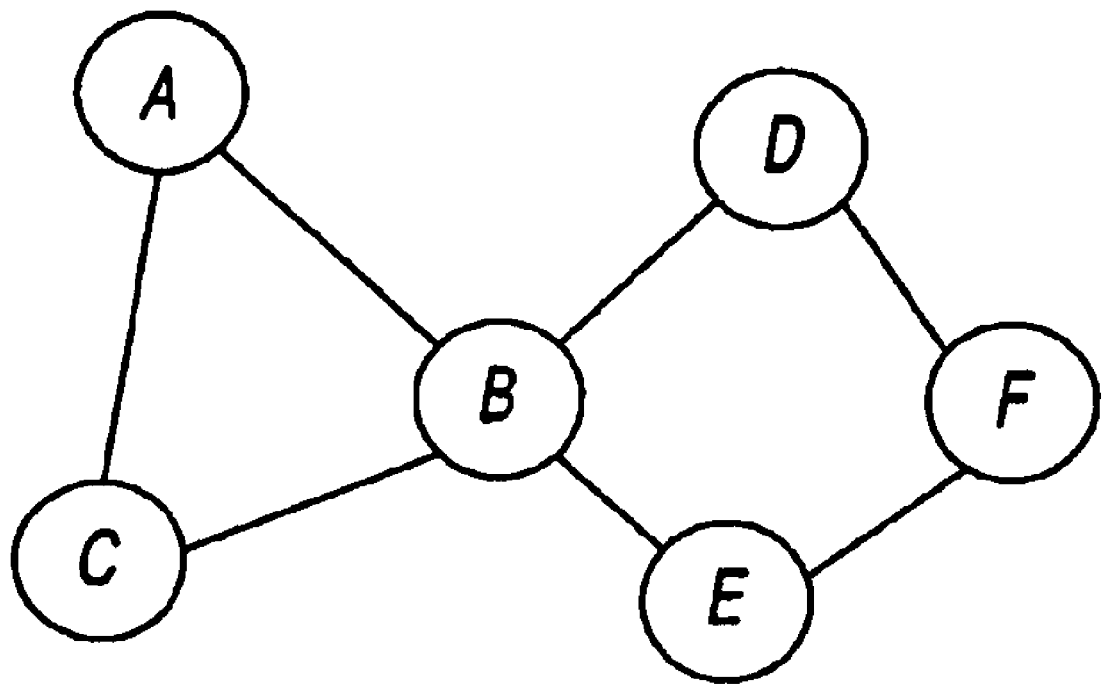
FIG. 12 is a schematic diagram of the network topology solution produced by the exemplary state space search tree of FIGS. 4 through 11.

FIG. 12 is a schematic diagram of the network topology solution produced by the exemplary state space search tree of FIGS. 4 through 11. More specifically, FIG. 12 is a schematic diagram of two rings, "(B D F E) (A B C)", realized from the solution represented by FIG. 11, State 14.

The preceding example shows how the algorithm of the present invention quickly homes in on a solution. In this case, the evaluation function uses a measure of COI that finds two related sets of demands. That is, the solution yielded two rings with a common node at endpoint B.

An interesting progression in the search occurs at State 6 when the method is selecting the next demand to add to the solution. The method determines that demand d2, between A and C, has a stronger COI on its own than the demand d3, between B and C, has with the set of demands already in the solution and forming a ring among B, D, E, and F. The method then starts a new ring with demand d2 standing alone, and eventually finds a COI among the demands between A, B and C.

Up to this point, the method has selected demands having one, if not both, endpoints in common with demands already in the existing ring. But in State 6, rather than selecting demand d3, which has node B in common with the existing ring ((d5, d4, d7, d6) (BDEF)), the method selects demand d2, which has no endpoints in common with the existing ring. This is because the aggregate COI of demand d3 is less than the aggregate COI of demand d2. That is, the bond (or inter-relatedness) that demand d3 has with the existing ring ((d5, d4, d7, d6) (BDEF)) in State 6 is weaker than the COI of demand d2 on its own. Accordingly, the method selects demand d2.

If the demand d2 between A and C had been much lower, this would have weakened the COI of the potential assignment of demand d2 to its own ring and in turn would have weakened its aggregate COI in State 6 to the point that demand d3's aggregate COI would have been greater. Thus, demand d3 would have been selected to be added instead. Therefore, the method could potentially have found a solution that would have placed all the demands on a single ring. This also shows that if a network designer preferred the single ring solution, he could change the behavior of the algorithm by merely changing the COI component of the evaluation function rather than having to rewrite the entire algorithm. This flexibility is one of advantages of using a state space search for the ring placement problem.

Another interesting point is that in the example illustrated in FIGS. 4 through 11, only the states that were examined by the search were shown. If the entire search space were shown, there would be 4,139 states, each corresponding to a possible, but not always feasible or practical, set of rings. This illustrates that for problems of any interesting or real world size, an exhaustive search of all the states is impractical. It also shows the importance of having an evaluation function that quickly and accurately guides the search to a solution.

Backtracking

FIGS. 13 through 16 illustrate the progression of the state space search tree where States 10, 11 and 12 do not yield any child states. Such a situation could occur, for example, where the production of child states from any of States 10, 11 or 12 would offer solutions of unacceptable expense. That is, a domain constraint, i.e., maximum expense, would inhibit the creation of child states from States 10, 11 and 12. To deal with this situation, the method must backtrack, upward through the tree, to find an alternative, viable solution.

FIG. 10 shows that the state space search tree has evolved to include States 10, 11 and 12, subordinate to State 9. State 11 is the Best State (COI=17.81), and it has an untried demand d1.

In the flowchart of FIG. 3, in step 335, the method selects demand d1 and moves it from the Untried Demand List to the Skipped Demand List. Note that this leaves State 11 with no untried demands. The method then advances to step 340.

In step 340, the method considers creating child states subordinate to State 11, but it is inhibited from doing so because of a domain constraint, such as an unacceptable expense. The method then advances to step 345.

In step 345, the method finds that State 11 has no untried demands. The method advances to step 350.

In step 350, the method moves State 11 from the Open List to the Closed List.

Figure 13:
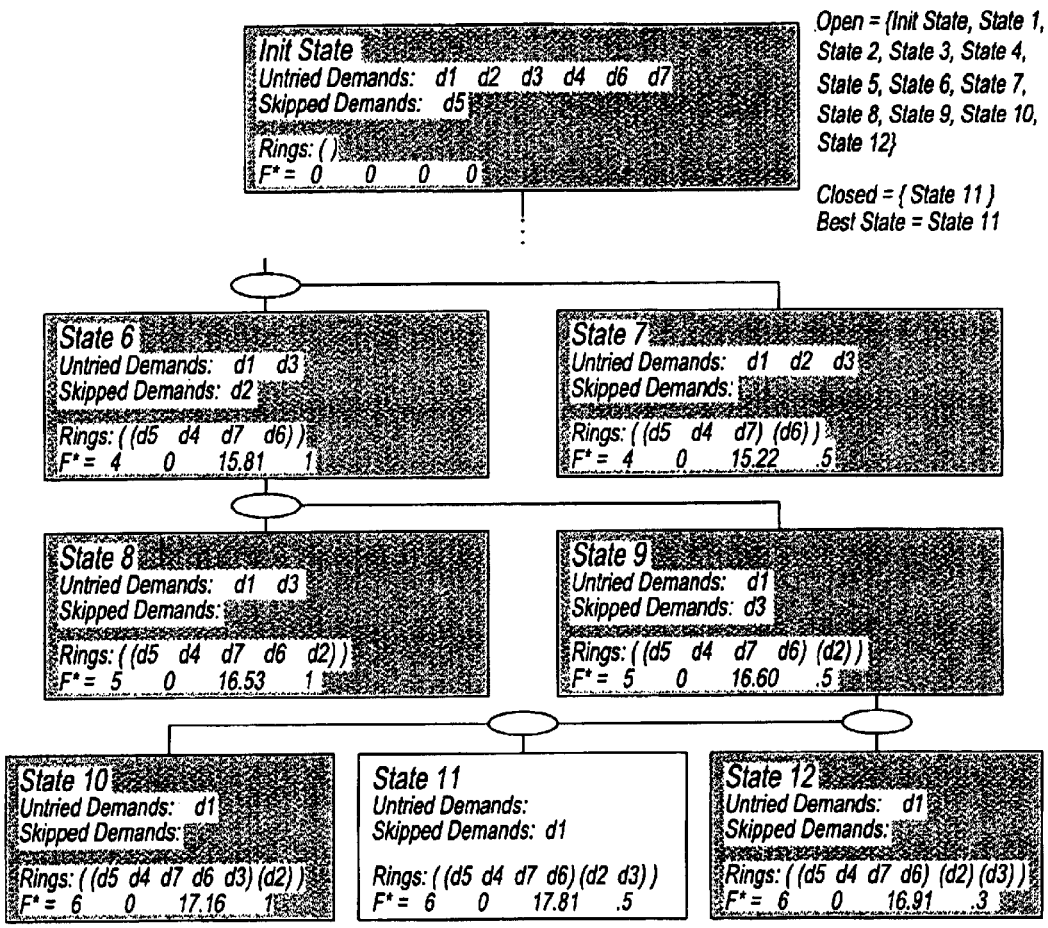
FIGS. 13 through 16 illustrate the progression of a state space search tree in a case where certain states do not yield any child states.

FIG. 13 shows the current status of the state space search tree. The method then advances to step 355.

In step 355, the method puts onto the, Open List, all of the child states that were created in step 340. In this example, no child states were created in step 340. The method then loops back to step 310.

FIG. 14 shows the status of the tree after State 10 has been denied child states because of the existence of a domain constraint. Note that State 10 was moved from the Open List to the Closed List.

Figure 15:
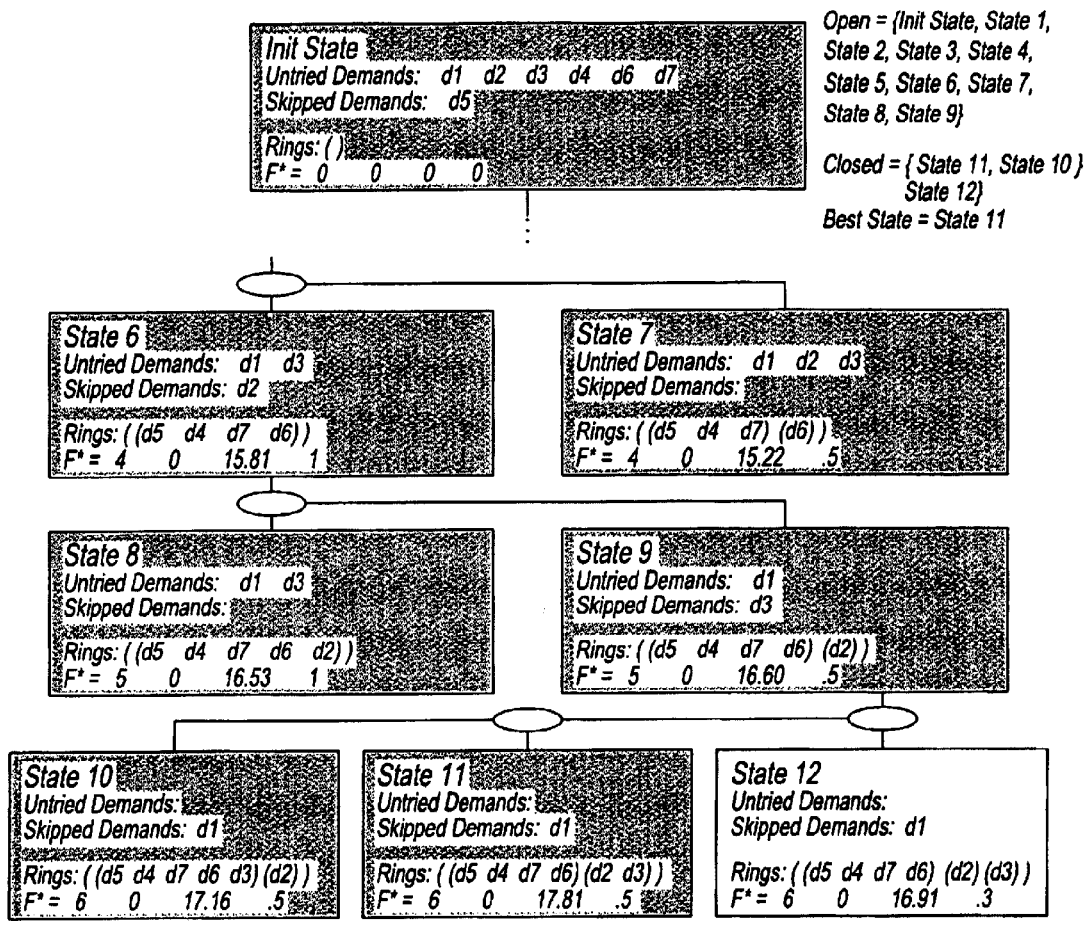

FIG. 15 shows the status of the tree after State 12 has been denied child states because of the existence of a domain constraint. Note that State 12 was moved from the Open List to the Closed List. The Open List now contains the Init State, and States 1 through 9, and the Closed List now contains States 11, 12 and 13.

In FIG. 3, at step 315, the method selects, from the Open List, the state with the best evaluation function. At this point, State 9 is selected (COI=16.60). However, State 9 will meet with the same fate as States 10 through 12, because in step 345, the method will find that State 9 has no untried demands.

Figure 16:
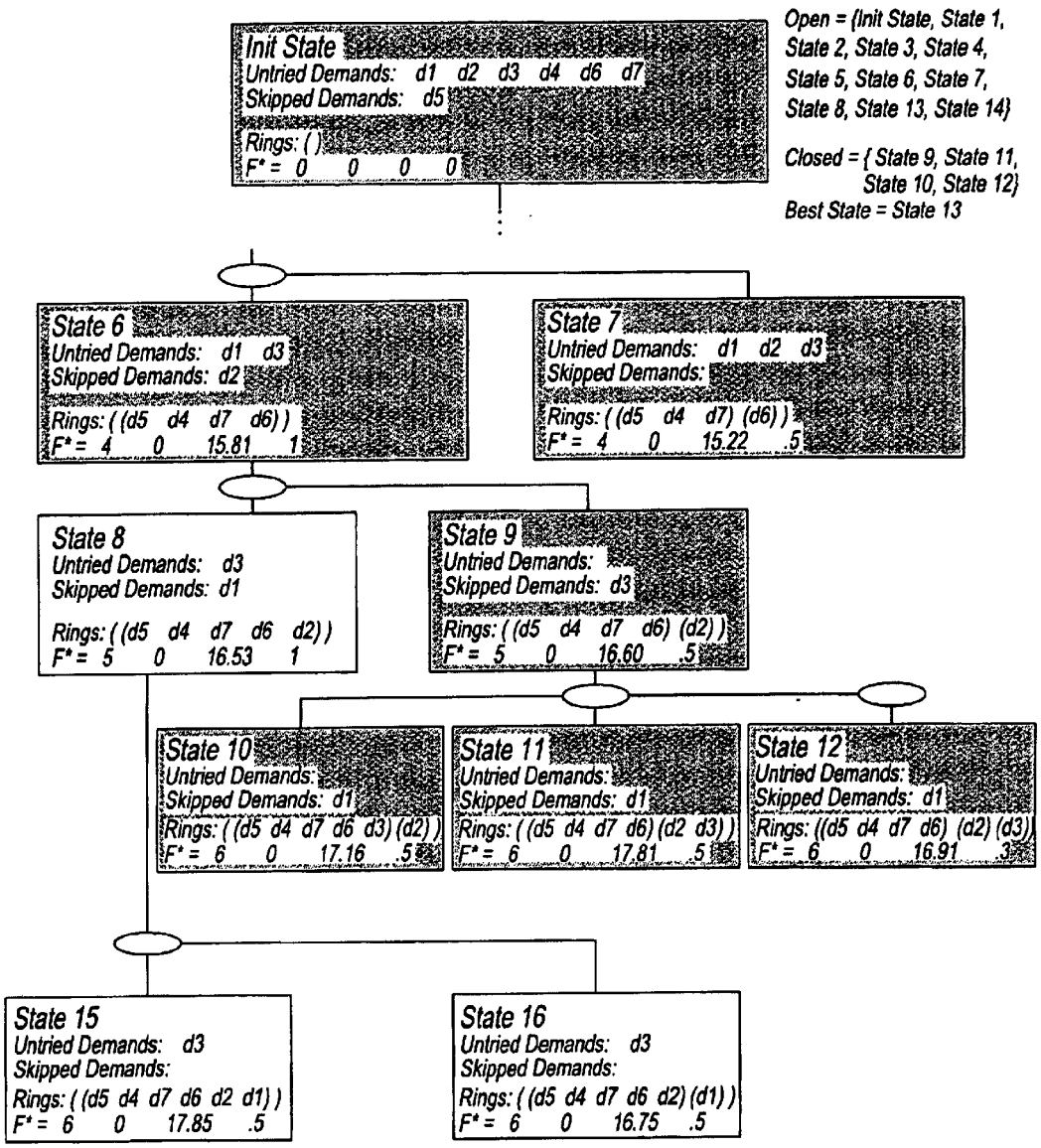

FIG. 16 shows that subsequently, the method will recognize State 8, and produce child states therefrom, namely states 15 and 16. State 15 has one ring, "(d5 d4 d7 d6 d2 d1)", and State 16 has two rings, "(d5 d4 d7 d6 d2) (d1)". Ultimately, in this example, a solution will be defined by a state subordinate to State 15.

Figure 17:
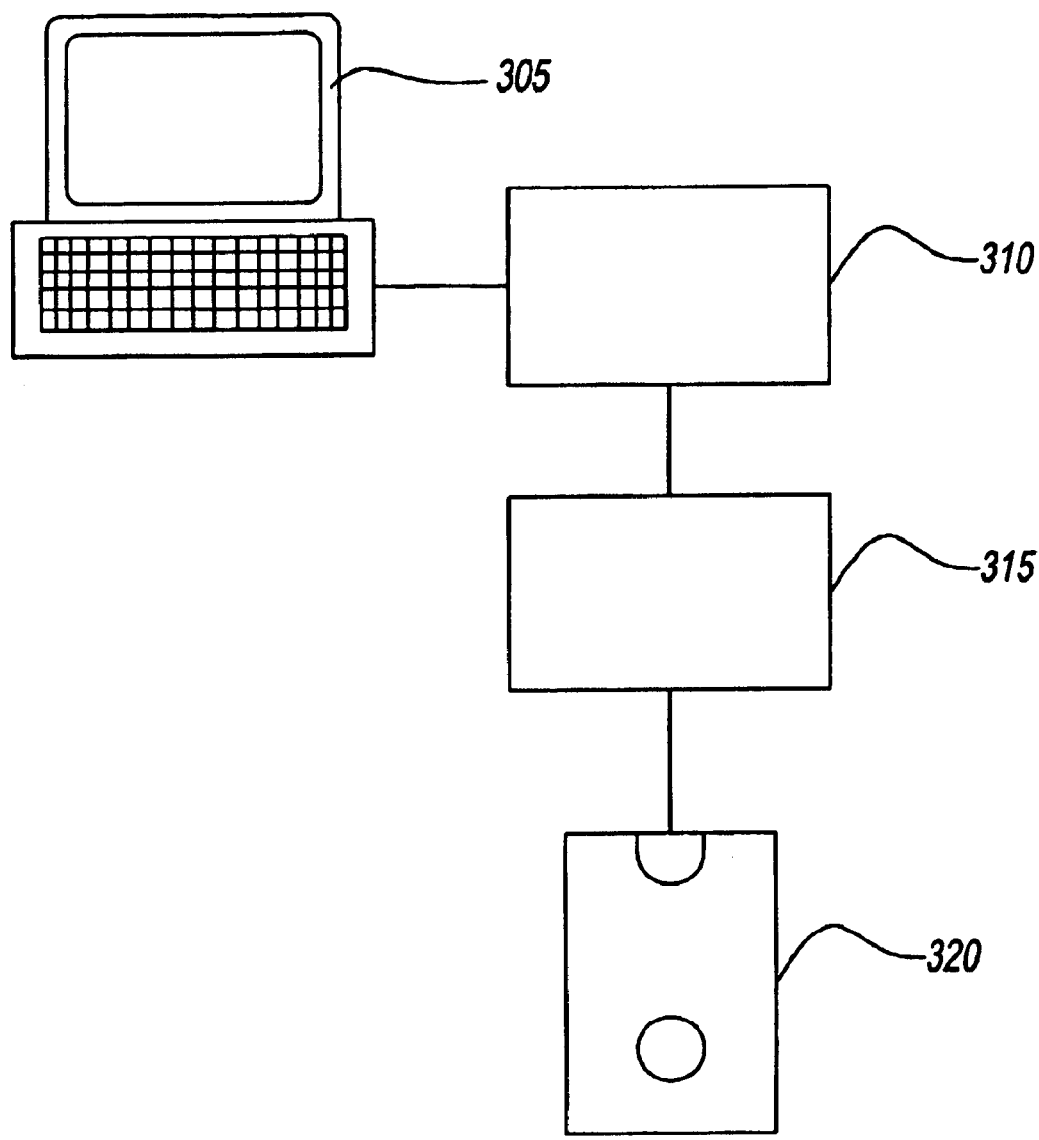
FIG. 17 is a block diagram of a computer system upon which a program can be executed to perform the method described herein for determining a network topology.

FIG. 17 is a block diagram of a computer system 300 upon which a program can be executed to perform the method described herein for determining a network topology. Computer system 300 includes a user interface 305, and a processor 310 with an associated memory 315.

Memory 315 contains data and instructions, typically in the form of a program, that define the executable steps for performing the method for determining the network topology.

Processor 310, receives parameters from user interface 305, and executes the instructions from memory 315 to perform the method described herein. Processor 310 sends a processed result, i.e., a description of the network topology, to user interface 305.

User interface 305 can be any conventional user interface, such as, but not limited to, a keyboard and a display.

While the procedures required to execute the invention hereof are indicated as already loaded into memory 315, they may be configured on a storage media, such as data memory 320 for subsequent loading into memory 315.

It should be understood that various alternatives and modifications could be devised by those skilled in the art. For example, the present invention can be applied to evaluate any appropriate criteria when determining whether to include a node in a particular ring of a network. The present invention can be applied to networks other than telecommunications networks. Furthermore, the present invention is contemplated to include a network constructed in accordance with a topology defined by the method described herein. Accordingly, the present invention is intended to embrace all such alternatives, modifications and variances that fall within the scope of the appended claims.

What is claimed is:

1. A method for determining a topology for a network, comprising:
    obtaining data that describes a plurality of requirements for a service between a first node and a second node; and
    searching a state space to define a solution that fulfills said plurality of requirements, wherein said searching includes:
        (a) selecting a requirement from said plurality of requirements to add to a potential solution, and
        (b) selecting a ring in said network to which said requirement can be added,
    wherein said solution provides a topographic arrangement for said first node and said second node in said ring.

2. The method of claim 1, wherein said network is selected from the group consisting of a SONET ring network and a Dense Wave Division Multiplexing (DWDM)/Optical ring network.

3. The method of claim 1, wherein said topographic arrangement comprises a first topographic location for said first node and a second topographic location for said second node.

4. The method of claim 1,
    wherein said first node and said second node are two of a plurality of nodes,
    wherein said data further describes requirements for service among said plurality of nodes, and
    wherein said solution provides a respective topographic arrangement for each of said plurality of nodes.

5. The method of claim 1, wherein said searching includes excluding a potential solution that violates a domain constraint.

6. The method of claim 5, wherein said domain constraint is selected from the group consisting of:
    (a) limiting said topographic arrangement to a bi-connected portion of said network,
    (b) limiting a number of nodes allowed on said ring,
    (c) limiting a number of repeaters allowed on said ring,
    (d) limiting a cost of said solution,
    (e) limiting a length of a fiber cycle in said network, and
    (f) limiting a usage of available capacity.

7. The method of claim 1, wherein said searching step evaluates a parameter indicative of a value of said potential solution.

8. The method of claim 7, wherein said parameter is selected from the group consisting of:
    (a) a depth at which said potential solution is located in a tree representing said state space,
    (b) a number of requirements that are skipped by said potential solution,
    (c) a community of interest value that quantifies a pattern of communication between a plurality of nodes in said network, as proposed by said potential solution,
    (d) an average number of intermediate nodes in paths of said network between said first node and said second node, as proposed by said potential solution,
    (e) a cost of said potential solution,
    (f) a number of rings in said potential solution,
    (g) a number of repeaters required by said potential solution,
    (h) a number of new fiber optic cables required by said potential solution,
    (i) a cost of new fiber optic cables required by said potential solution, and
    (j) a length of new fiber optic cables required by said potential solution.

9. The method of claim 1,
    wherein said searching step determines a community of interest (COI) of said requirement, and
    wherein said COI is a value that quantifies a pattern of communication between a plurality of nodes.

10. The method of claim 1,
    wherein said requirement includes two demand endpoints and a demand quantity, and
    wherein said searching step determines a community of interest (COI) of said requirement according to the following formula:

$$COI_{Basic} = \frac{\text{demand quantity}}{2(\text{distance between the demand endpoints})^2}$$

when determining said COI for a single requirement:

$COI = 1.1(COI_{Basic})$ when determining said COI for more than a single requirement in a set of requirements:
    (A) If both demand endpoints of said requirement are in common with endpoints of another requirement in said set, then $COI = 3(COI_{Basic})$ (B) If only one demand endpoint of said requirement is in common with an endpoint of another requirement in said set, then $COI = 2(COI_{Basic})$ (C) If no demand endpoint of said requirement is in common with another demand endpoint in said set, then $COI = COI_{Basic}$.

11. The method of claim 10, wherein said searching step determines an aggregate COI for said requirement by:
    determining each potential ring assignment for said requirement,
    computing a COI of said each potential ring assignment, and
    summing said COIs of said potential ring assignments.

12. A system for determining a topology for a network, comprising:
    means for obtaining data that describes a plurality of requirements for a service between a first node and a second node; and
    means for searching a state space to define a solution that fulfills said plurality of requirements, wherein said searching includes:
        (a) selecting a requirement from said plurality of requirements to add to a potential solution, and
        (b) selecting a in said network to which said requirement can be added,
    wherein said solution provides a topographic arrangement for said first node and said second node in said ring.

13. The system of claim 12, wherein said network is selected from the group consisting of a SONET ring network and a Dense Wave Division Multiplexing (DWDM)/Optical ring network.

14. The system of claim 12, Wherein said topographic arrangement comprises a first topographic location for said first node and a second topographic location for said second node.

15. The system of claim 12,
wherein said first node and said second node are two of a plurality of nodes,
wherein said data further describes requirements for service among said plurality of nodes, and
wherein said solution provides a respective topographic arrangement for each of said plurality of nodes.

16. The system of claim 12, wherein said searching means has means for excluding a potential solution that violates a domain constraint.

17. The system of claim 16, wherein said domain constraint is selected from the group consisting of.
   (a) limiting said topographic arrangement to a bi-connected portion of said network,
   (b) limiting a number of nodes allowed on said ring,
   (c) limiting a number of repeaters allowed on said ring,
   (d) limiting a cost of said solution,
   (e) limiting a length of a fiber cycle in said network, and
   (f) limiting a usage of available capacity.

18. The system of claim 12, wherein said searching means evaluates a parameter indicative of a value of said potential solution.

19. The system of claim 18, wherein said parameter is selected from the group consisting of:
   (a) a depth at which said potential solution is located in a tree representing said state space,
   (b) a number of requirements that are skipped by said potential solution,
   (c) a community of interest value that quantifies a pattern of communication between a plurality of nodes in said network, as proposed by said potential solution,
   (d) an average number of intermediate nodes in paths of said network between said first node and said second node, as proposed by said potential solution,
   (e) a cost of said potential solution,
   (f) a number of rings in said potential solution,
   (g) a number of repeaters required by said potential solution,
   (h) a number of new fiber optic cables required by said potential solution,
   (i) a cost of new fiber optic cables required by said potential solution, and
   (j) a length of new fiber optic cables required by said potential solution.

20. The system of claim 12,
wherein said searching means determines a community of interest (COI) of said requirement, and
wherein said COI is a value that quantifies a pattern of communication between a plurality of nodes.

21. The system of claim 12,
wherein said requirement includes two demand endpoints and a demand quantity, and
wherein said searching means determines a community of interest (COI) of said requirement according to the following formula:

$$COI_{Basic} = \frac{\text{demand quantity}}{2(\text{distance between the demand endpoints})^2}$$

when determining said COI for a single requirement:

$$COI = 1.1 \, (COI_{Basic})$$

when determining said COI for more than a single requirement in a set of requirements:
   (A) If both demand endpoints of said requirement are in common with endpoints of another requirement in said set, then $$CO = 3(COI_{Basic})$$

(B) If only one demand endpoint of said requirement is in common with an endpoint of another requirement in said set, then $$CO = 2(COI_{Basic})$$

(C) If no demand endpoint of said requirement is in common with another demand endpoint in said set, then $$CO = COI_{Basic}.$$

22. The system of claim 21, wherein said searching means determines an aggregate COI for said requirement by:
   determining each potential ring assignment for said requirement,
   computing a COI of said each potential ring assignment, and
   summing said COIs of said potential ring assignments.

23. A storage media including instructions for controlling a processor that, in turn, determines a topology for a network, said storage media comprising:
   means for controlling said processor to obtain data that describes a plurality of requirements for a service between a first node and a second node; and
   means for controlling said processor to search a state space to define a solution that fulfills said plurality of requirements, wherein said search includes:
      (a) selecting a requirement from said plurality of requirements to add to a potential solution, and
      (b) selecting a ring in said network to which said requirement can be added,
   wherein said solution provides a topographic arrangement for said first node and said second node in said ring.

24. A ring network having a topology determined by executing a method comprising the steps of:
   obtaining data that describes a plurality of requirements for a service between a first node and a second node; and
   searching a state space to define a solution that fulfills said plurality of requirements, wherein said searching includes:
      (a) selecting a requirement from said plurality of requirements to add to a potential solution, and
      (b) selecting a ring in said network to which said requirement can be added,
   wherein said solution specifies a topographic arrangement for said first node and said second node in said ring.

* * * * *